United States Patent
Bhattad et al.

(10) Patent No.: US 11,375,542 B2
(45) Date of Patent: Jun. 28, 2022

(54) MULTI-SUB-BAND LBT OPERATION

(71) Applicant: QUALCOMM Incorporated, San Diego, CA (US)

(72) Inventors: Kapil Bhattad, Bangalore (IN); Jing Sun, San Diego, CA (US); Xiaoxia Zhang, San Diego, CA (US); Pravjyot Singh Deogun, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 16/841,278

(22) Filed: Apr. 6, 2020

(65) Prior Publication Data

US 2020/0322989 A1 Oct. 8, 2020

(30) Foreign Application Priority Data

Apr. 8, 2019 (IN) .............................. 201941014082

(51) Int. Cl.
*H04L 12/28* (2006.01)
*H04W 74/08* (2009.01)
(Continued)

(52) U.S. Cl.
CPC ... *H04W 74/0808* (2013.01); *H04W 72/0453* (2013.01)

(58) Field of Classification Search
CPC . H04W 16/14; H04W 72/14; H04W 72/0453; H04W 74/085; H04W 74/0808; H04W 74/0816; H04W 4/0816
(Continued)

(56) References Cited

U.S. PATENT DOCUMENTS

2017/0311349 A1* 10/2017 Zhang ................ H04W 74/0808
2020/0213863 A1* 7/2020 Wu .................... H04W 72/0446
(Continued)

FOREIGN PATENT DOCUMENTS

WO WO-2018071068 A1 4/2018

OTHER PUBLICATIONS

Huawei et al., "Coexistence and Channel Access for NR Unlicensed Band Operations," 3GPP Draft, 3GPP TSG RAN WG1 Ad-Hoc Meeting 1901, R1-1900060, 3rd Generation Partnership Project (3GPP), Mobile Competence Centre, 650, Route Des Lucioles, F-06921, Sophia-Antipolis Cedex, France, vol. RAN WG1, No. Taipei, Jan. 21, 2019-Jan. 25, 2019, Jan. 11, 2019 (Jan. 11, 2019), XP051575686, 16 pages, Retrieved from the Internet:URL:http://www.3gpp.org/ftp/tsg%5Fran/WG1%5FRL1/TSGR1%5FAH/NR%5FAH%5F1901/Docs/R1%2D1900060%2Ezip, [retrieved on Jan. 11, 2019], Section 2.2, sections: 2.1.1 LBT type for NR-U UL physical channels, 2 .1.2 LBT type for NR-U DL signals and channels, 2.3 cws adjustment . Fig. 1 Impact of CB mapping on CWS adjustment and retransmission efficiency; Fig. 3 CWS adjustment for 2-step RACH; Figure 4 CWS adjustment in 4-step RACH; 2.6 Receiver-assisted LBT; 2.7 Joint channel access of neighbouring TRPs (Spatial Reuse); sub-section, "LBT for transmission alignment", Fig. 3 Illustration of joint TRP channel access using LBT deferral with individual backoff aligned to end at the common start point ttarget. When successful, 3 Conclusions.

(Continued)

*Primary Examiner* — John Pezzlo
(74) *Attorney, Agent, or Firm* — Holland & Hart LLP/Qualcomm

(57) ABSTRACT

The described techniques provide for efficiently contending for access to a shared radio frequency spectrum for communicating on multiple allocated sub-bands across multiple carriers. As described herein, a user equipment (UE) may first identify allocated sub-bands across multiple carriers in a shared radio frequency spectrum. The UE may then select a carrier and at least one of the multiple allocated sub-bands within the carrier on which to perform a listen-before-talk (LBT) procedure of a first type, and the UE may perform the LBT procedure of the first type on the at least one sub-band. In addition, the UE may also perform LBT procedures of a second type on allocated sub-bands within carriers different (Continued)

from the selected carrier. Based on the results of the LBT procedures, the UE may communicate with the base station on the allocated sub-bands across the multiple carriers in the shared radio frequency spectrum.

30 Claims, 15 Drawing Sheets

(51) Int. Cl.
  *H04W 72/04* (2009.01)
  *H04L 1/16* (2006.01)
(58) Field of Classification Search
  USPC .......................................... 370/252, 329, 430
  See application file for complete search history.

(56) References Cited

U.S. PATENT DOCUMENTS

2020/0275484 A1* 8/2020 Xu ..................... H04W 72/0453
2020/0275485 A1* 8/2020 Babaei ................ H04W 74/004

OTHER PUBLICATIONS

International Search Report and Written Opinion—PCT/US2020/027010—ISA/EPO—dated Jun. 17, 2020.
LENOVO: "Multi-carrier LBT Operation for LAA," 3GPP Draft, 3GPP TSG RAN WG1 Meeting #82bis, R1-155816, 3rd Generation Partnership Project (3GPP), Mobile Competence Centre, 650, Route Des Lucioles, F-06921, Sophia-Antipolis Cedex, France, vol. RAN WG1, No. Malmo, Sweden; Oct. 5, 2015-Oct. 9, 2015, Oct. 4, 2015 (Oct. 4, 2015), XP051002619, 3 pages, Retrieved from the Internet:URL: http://www.3gpp.org/ftp/Meetings_3GPP_SYNC/RAN1/Docs/ [retrieved on Oct. 4, 2015], section 2; figure 1.
Qualcomm Incorporated: "Channel Access Procedures for NR Unlicensed," 3GPP Draft, 3GPP TSG RAN WG1 Meeting #97, R1-1907261, 7.2.2.2.1, Channel Access Procedures for NR Unlicensed, 3rd Generation Partnership Project (3GPP), Mobile Competence Centre, 650, Route Des Lucioles, F-06921, Sophia-Antipolis Cedex, France, vol. RAN WG1, No. Reno, US; May 13, 2019-May 17, 2019, May 13, 2019 (May 13, 2019), XP051728701, 18 pages, Retrieved from the Internet: URL: http://www.3gpp.org/ftp/Meetings%5F3GPP%5FSYNC/RAN1/Docs/R1%2D1907261%2Ezip [retrieved on May 13, 2019], Section 4.9; figure 6.

* cited by examiner

MULTI-SUB-BAND LBT OPERATION

CROSS REFERENCE

The present application for patent claims the benefit of India Provisional Patent Application No. 201941014082 by BHATTAD et al., entitled "MULTI-SUB-BAND LBT OPERATION," filed Apr. 8, 2019, assigned to the assignee hereof, and expressly incorporated by reference herein.

BACKGROUND

The following relates generally to wireless communications, and more specifically to listen-before-talk (LBT) operation with multiple sub-bands.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless communications systems may support communications between a base station and a UE on multiple carriers in a shared radio frequency spectrum, where each carrier may include multiple sub-bands. The shared radio frequency spectrum may be a spectrum that is unlicensed, licensed to multiple operators, or licensed to a single operation with opportunistic access by other devices (e.g., a licensed radio frequency spectrum, an unlicensed radio frequency spectrum, or a combination of licensed and unlicensed radio frequency spectrum). Some techniques for supporting communications on multiple carriers in a shared radio frequency spectrum may be deficient.

SUMMARY

A method for wireless communication at a UE is described. The method may include identifying a plurality of carriers and a plurality of sub-bands within the plurality of carriers configured for uplink transmissions from the UE to a base station in a shared radio frequency spectrum, selecting a carrier from the plurality of carriers and one sub-band of two or more sub-bands within the carrier on which to perform a listen-before-talk procedure of a first type, the two or more sub-bands being a part of the plurality of sub-bands configured for the uplink transmissions, performing the listen-before-talk procedure of the first type on the one sub-band of the two or more sub-bands within the selected carrier, performing one or more listen-before-talk procedures of a second type on sub-bands of the plurality of sub-bands within carriers of the plurality of carriers different from the selected carrier, performing one or more listen-before-talk procedures of the second type on remaining sub-bands of the two or more sub-bands within the selected carrier, and communicating on the carriers of the plurality of carriers different from the selected carrier based at least in part on the listen-before-talk procedure of the first type and the one or more listen-before-talk procedures of the second type.

A method for wireless communication at a UE is described. The method may include identifying a plurality of carriers and a plurality of sub-bands within the plurality of carriers configured for uplink transmissions from the UE to a base station in a shared radio frequency spectrum, performing respective listen-before-talk procedures of a first type on two or more sub-bands within a selected carrier of the plurality of carriers, performing one or more listen-before-talk procedures of a second type on sub-bands of the plurality of sub-bands within carriers of the plurality of carriers different from the selected carrier, and communicating on the carriers of the plurality of carriers different from the selected carrier based at least in part on the listen-before-talk procedures of the first type and the one or more listen-before-talk procedures of the second type.

An apparatus for wireless communication at a UE is described. The apparatus may include a processor, memory in electronic communication with the processor, and instructions stored in the memory. The instructions may be executable by the processor to cause the apparatus to identify a plurality of carriers and a plurality of sub-bands within the plurality of carriers configured for uplink transmissions from the UE to a base station in a shared radio frequency spectrum, select a carrier from the plurality of carriers and one sub-band of two or more sub-bands within the carrier on which to perform a listen-before-talk procedure of a first type, the two or more sub-bands being a part of the plurality of sub-bands configured for the uplink transmissions, perform the listen-before-talk procedure of the first type on the one sub-band of the two or more sub-bands within the selected carrier, perform one or more listen-before-talk procedures of a second type on sub-bands of the plurality of sub-bands within carriers of the plurality of carriers different from the selected carrier, perform one or more listen-before-talk procedures of the second type on remaining sub-bands of the two or more sub-bands within the selected carrier, and communicate on the carriers of the plurality of carriers different from the selected carrier based at least in part on the listen-before-talk procedure of the first type and the one or more listen-before-talk procedures of the second type.

An apparatus for wireless communication at a UE is described. The apparatus may include a processor, memory in electronic communication with the processor, and instructions stored in the memory. The instructions may be executable by the processor to cause the apparatus to identify a plurality of carriers and a plurality of sub-bands within the plurality of carriers configured for uplink transmissions from the UE to a base station in a shared radio frequency spectrum, perform respective listen-before-talk procedures of a first type on two or more sub-bands within a selected carrier of the plurality of carriers, perform one or more listen-before-talk procedures of a second type on sub-bands of the plurality of sub-bands within carriers of the plurality of carriers different from the selected carrier, and communicate on the carriers of the plurality of carriers different from the selected carrier based at least in part on the listen-before-talk procedures of the first type and the one or more listen-before-talk procedures of the second type.

Another apparatus for wireless communication at a UE is described. The apparatus may include means for identifying a plurality of carriers and a plurality of sub-bands within the plurality of carriers configured for uplink transmissions from the UE to a base station in a shared radio frequency spectrum, means for selecting a carrier from the plurality of carriers and one sub-band of two or more sub-bands within the carrier on which to perform a listen-before-talk procedure of a first type, the two or more sub-bands being a part of the plurality of sub-bands configured for the uplink transmissions, means for performing the listen-before-talk procedure of the first type on the at least one sub-band of the two or more sub-bands within the selected carrier, means for performing one or more listen-before-talk procedures of a second type on sub-bands of the plurality of sub-bands within carriers of the plurality of carriers different from the selected carrier, means for performing one or more listen-before-talk procedures of the second type on remaining sub-bands of the two or more sub-bands within the selected carrier, and means for communicating on the carriers of the plurality of carriers different from the selected carrier based at least in part on the listen-before-talk procedure of the first type and the one or more listen-before-talk procedures of the second type.

Another apparatus for wireless communication at a UE is described. The apparatus may include means for identifying a plurality of carriers and a plurality of sub-bands within the plurality of carriers configured for uplink transmissions from the UE to a base station in a shared radio frequency spectrum, means for performing respective listen-before-talk procedures of a first type on two or more sub-bands within a selected carrier of the plurality of carriers, means for performing one or more listen-before-talk procedures of a second type on sub-bands of the plurality of sub-bands within carriers of the plurality of carriers different from the selected carrier, and means for communicating on the carriers of the plurality of carriers different from the selected carrier based at least in part on the listen-before-talk procedures of the first type and the one or more listen-before-talk procedures of the second type A non-transitory computer-readable medium storing code for wireless communication at a UE is described. The code may include instructions executable by a processor to identify a plurality of carriers and a plurality of sub-bands within the plurality of carriers configured for uplink transmissions from the UE to a base station in a shared radio frequency spectrum, select a carrier from the plurality of carriers and one sub-band of two or more sub-bands within the carrier on which to perform a listen-before-talk procedure of a first type, the two or more sub-bands being a part of the plurality of sub-bands configured for the uplink transmissions, perform the listen-before-talk procedure of the first type on the one sub-band of the two or more sub-bands within the selected carrier, perform one or more listen-before-talk procedures of a second type on sub-bands of the plurality of sub-bands within carriers of the plurality of carriers different from the selected carrier, perform one or more listen-before-talk procedures of the second type on remaining sub-bands of the two or more sub-bands within the selected carrier, and communicate on the carriers of the plurality of carriers different from the selected carrier based at least in part on the listen-before-talk procedure of the first type and the one or more listen-before-talk procedures of the second type.

A non-transitory computer-readable medium storing code for wireless communication at a UE is described. The code may include instructions executable by a processor to identify a plurality of carriers and a plurality of sub-bands within the plurality of carriers configured for uplink transmissions from the UE to a base station in a shared radio frequency spectrum, perform respective listen-before-talk procedures of a first type on two or more sub-bands within a selected carrier of the plurality of carriers, perform one or more listen-before-talk procedures of a second type on sub-bands of the plurality of sub-bands within carriers of the plurality of carriers different from the selected carrier, and communicate on the carriers of the plurality of carriers different from the selected carrier based at least in part on the listen-before-talk procedures of the first type and the one or more listen-before-talk procedures of the second type.

DETAILED DESCRIPTION

Figure 1:
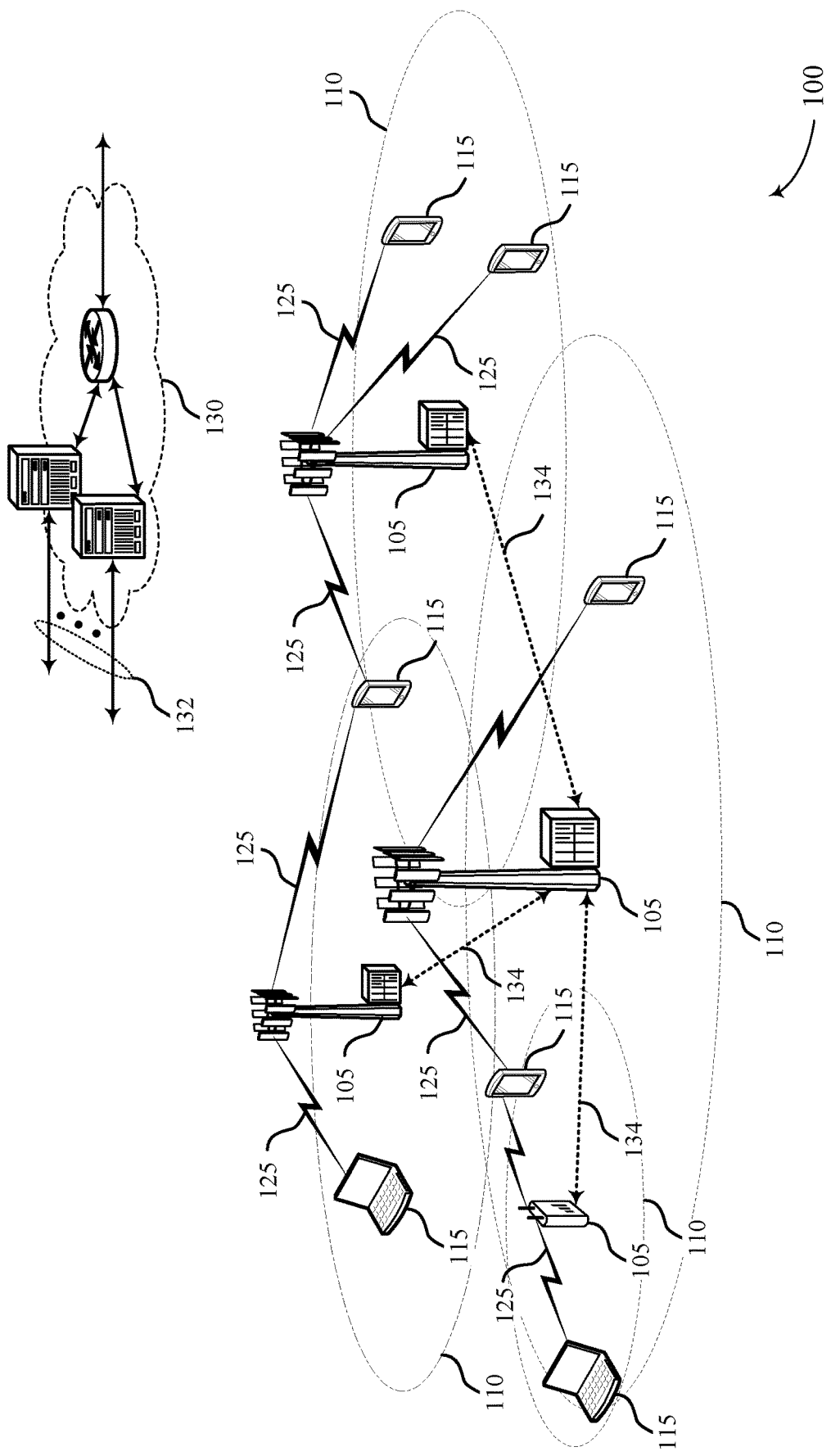
FIG. 1 illustrates an example of a wireless communications system that supports listen-before-talk (LBT) operation with multiple sub-bands in accordance with aspects of the present disclosure.

In some wireless communications networks (e.g., Long-Term Evolution (LTE) networks), a user equipment (UE) may be configured to communicate with a base station on multiple carriers in a shared radio frequency spectrum, where each carrier may include a single sub-band. For instance, the UE may receive an uplink grant allocating multiple carriers in a shared radio frequency spectrum for transmitting uplink data to a base station. In such systems, in an attempt to gain access to the shared radio frequency spectrum to transmit the uplink data, the UE may perform a category 4 listen-before-talk (LBT) procedure (e.g., or other fairness-based LBT procedure) on one of the carriers, and the UE may perform category 2 LBT procedures (e.g., or other one-time LBT procedures) on the remaining carriers. Based on the results of these LBT procedures, the UE may then communicate with the base station on the multiple carriers.

Using the techniques described herein for LTE networks, for example, a UE may be able to efficiently contend for access to the shared radio frequency spectrum for transmitting on the multiple carriers, while maintaining fairness and accessibility. For example, because the UE may perform a fairness-based LBT procedure on one of the carriers (e.g., rather than performing one-time LBT procedures on all the carriers), the contention procedure for the UE may be similar to the contention procedures performed by other UEs (e.g., resulting in fairness). Further, because the UE may not be performing the fairness-based LBT procedure on all of the carriers, the odds of the UE gaining access to the shared radio frequency spectrum to multiple carriers may be at least satisfactory (e.g., resulting in accessibility). In other wireless communications networks (e.g., New Radio (NR) networks), however, a UE may be configured to communicate with a base station on multiple carriers in a shared radio frequency spectrum, where each carrier may include multiple sub-bands each having a bandwidth that satisfies a criteria for independent channel access (e.g., 20 MHz). Since, in such other wireless networks, each carrier may include multiple sub-bands allocated for communicating with a base station, the techniques for contending for access to a shared radio frequency spectrum in LTE networks (e.g., where a carrier contains a single allocated sub-band) may not be satisfactory for such other wireless networks.

As described herein, a UE may support efficient techniques for contending for access to a shared radio frequency spectrum for communicating with a base station on multiple carriers, where each carrier may include multiple sub-bands subject to independent channel access (e.g., while ensuring fairness and accessibility in the shared radio frequency spectrum). In particular, the UE may first identify sub-bands allocated for communications with a base station across multiple carriers in a shared radio frequency spectrum. The UE may then select a carrier and at least one of the multiple allocated sub-bands within the carrier on which to perform a category 4 LBT procedure (or other fairness-based LBT procedure), and the UE may perform the category 4 LBT procedure on the at least one sub-band. In addition, the UE may perform category 2 LBT procedures (e.g., or other one-time LBT procedures) on allocated sub-bands within carriers different from the selected carrier. Based on the results of the category 4 procedure and the category 2 procedures, the UE may communicate with the base station on the allocated sub-bands across the multiple carriers in the shared radio frequency spectrum.

Aspects of the disclosure introduced above are described herein in the context of a wireless communications system. Examples of processes and signaling exchanges that support LBT operation with multiple sub-bands are then described. Aspects of the disclosure are further illustrated by and described with reference to apparatus diagrams, system diagrams, and flowcharts that relate to LBT operation with multiple sub-bands.

FIG. 1 illustrates an example of a wireless communications system 100 that supports LBT operation with multiple sub-bands in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling.

A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)). Further, a carrier may be used for communications in a shared or unshared radio frequency spectrum.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ feedback may include an acknowledgement (ACK) indicating that data was received and decoded successfully or a negative acknowledgement (NACK) indicating that data was not received or decoded successfully. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some cases, wireless communications system 100 may utilize both unshared (e.g., licensed) and shared (e.g., unlicensed) radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel (e.g., an LBT subchannel or a frequency band that is accessible via an LBT procedure) is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some implementations, there may be different categories of LBT procedures, including category 1 LBT (e.g., no LBT), category 2 LBT (e.g., LBT including one-time channel sensing for a fixed period without a back-off period), category 3 LBT (e.g., LBT with a random (or other) back-off period and a fixed sized contention window), and category 4 LBT (e.g., LBT with a random (or other) back-off period and a variable sized contention window). In some cases, a category 2 LBT procedure may be referred to as a one-time LBT procedure where a UE 115 may perform channel sensing for a defined duration (e.g., 25 μs). Further, a category 4 LBT procedure may be referred to as a fairness-based LBT procedure for performing channel sensing with a backoff, where the backoff may be used to prevent a UE from accessing a channel immediately after detecting that the channel is clear.

Figure 2:
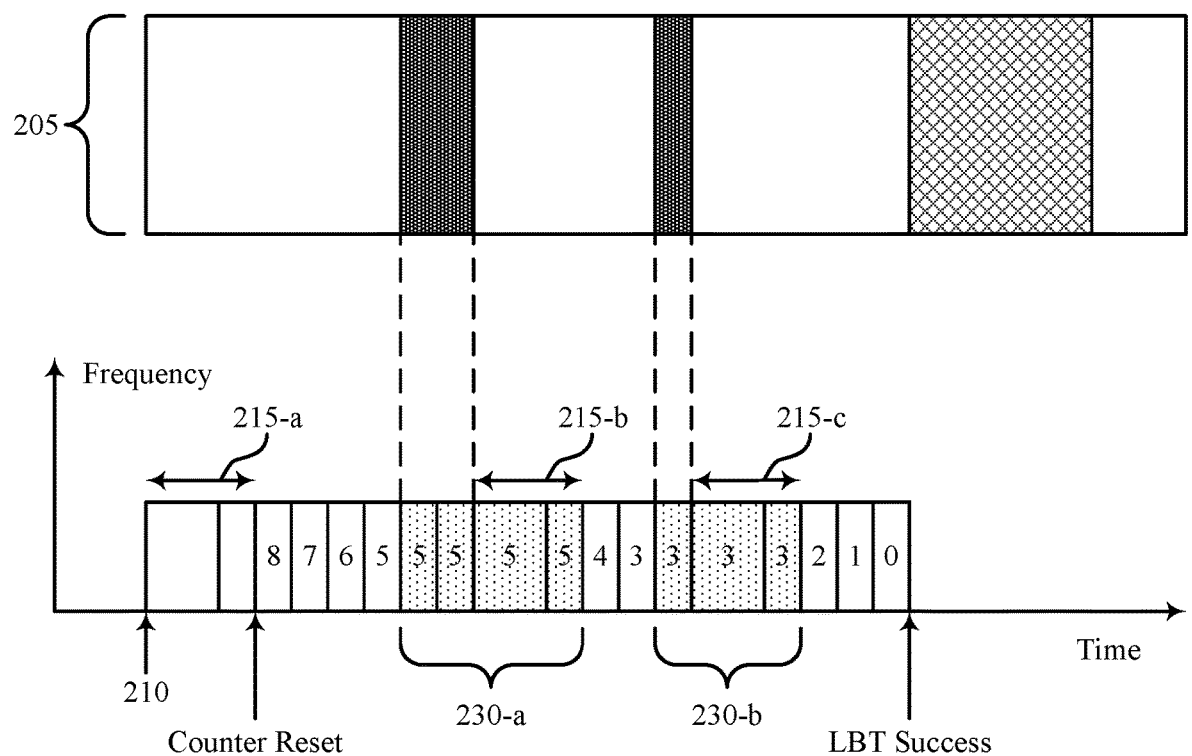
FIG. 2 illustrates an example of a category 4 LBT procedure in accordance with aspects of the present disclosure.

FIG. 2 illustrates an example of a category 4 LBT procedure 200 in accordance with aspects of the present disclosure. In the example of FIG. 2, at 210, a UE 115 may initiate the category 4 LBT procedure on a carrier 205, and the UE 115 may perform channel sensing for a defer duration 215-a. After performing the channel sensing and failing to detect energy on the channel (e.g., energy above a threshold), the UE 115 may reset an LBT counter. For example, in FIG. 2, the counter is reset to 8. The UE 115 may then decrement the counter when the UE 115 fails to detect energy on the carrier 205 (e.g., the sensed energy is below a threshold), and the UE 115 may freeze the counter once the UE 115 detects interference 220 (e.g., the sensed energy is above the threshold) on the carrier 205. For example, the UE 115 may freeze the counter for time period 230-a including defer duration 215-b and time period 230-b including defer duration 215-c. Once the UE 115 determines that the counter has been decremented to a zero value, the UE 115 may determine that the LBT procedure is successful. Accordingly, the UE 115 may access the carrier 205 in the shared radio frequency spectrum for an uplink transmission 225 to a base station 105.

Figure 3:
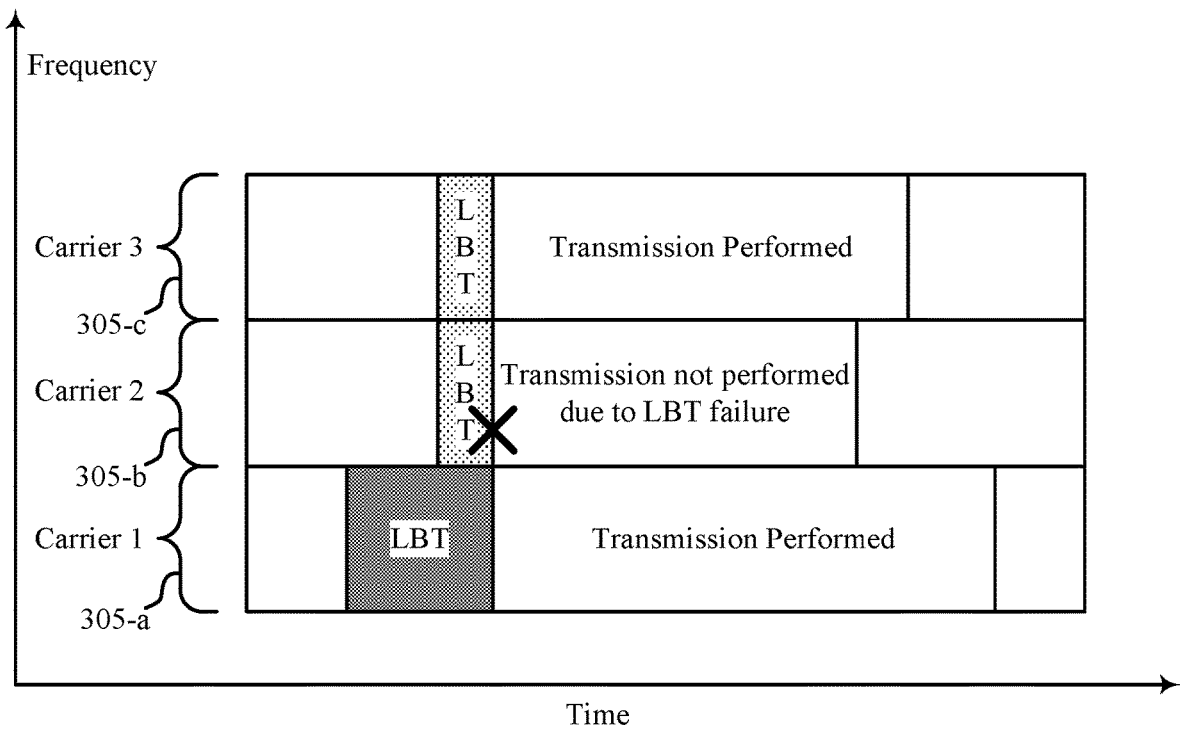
FIG. 3 illustrates an example of category 4 and category 2 LBT procedures performed in an attempt to gain access to a shared radio frequency spectrum.

FIG. 3 illustrates an example of category 4 and category 2 LBT procedures 300 performed in an attempt to gain access to a shared radio frequency spectrum in accordance with aspects of the present disclosure. In the example of FIG. 3, a UE 115 may be configured to communicate with a base station 105 on multiple carriers in the shared radio frequency spectrum in a network where each carrier may include a single sub-band (e.g., minimum bandwidth of LBT). For instance, the UE 115 may receive an uplink grant allocating multiple carriers in a shared radio frequency spectrum for transmitting uplink data to a base station 105 in an LTE network. Accordingly, the UE 115 may select a carrier on which to perform a category 4 LBT procedure 310 by random selection of one of the allocated sub-bands within and across carriers, such that the UE 115 may perform the category 4 LBT procedure 310 to gain access to the shared radio frequency spectrum. In one example, the UE 115 may select from allocated sub-bands at random (e.g., sub-bands within and across carriers, resulting in uniform distribution).

The UE 115 may then perform the category 4 LBT procedure 310 on the selected carrier (e.g., carrier 1 305-a or the single sub-band within carrier 1 305-a) and perform category 2 LBT procedures 315 on the remaining carriers (e.g., carrier 2 305-b and carrier 3 305-c). In the current example, the UE 115 may determine that the category 4 LBT procedure on carrier 1 305-a was successful, the category 2 LBT procedure on carrier 2 305-b has failed, and the category 2 LBT procedure on carrier 3 305-c was successful. Thus, the UE 115 may transmit on carrier 1 305-a and carrier 3 305-c and suppress transmissions on carrier 2 305-b. Using these techniques for performing LBT procedures in LTE networks, for example, a UE 115 may be able to efficiently contend for access to the shared radio frequency spectrum for transmitting on the multiple carriers, while maintaining fairness and accessibility. For example, because the UE 115 may perform a fairness-based LBT procedure on one of the carriers (e.g., rather than performing one-time LBT procedures on all the carriers), the contention procedure for the UE 115 may be similar to the contention procedures performed by other UEs 115 (e.g., resulting in fairness). Further, because the UE 115 may not be performing the fairness-based LBT procedure on all of the carriers, the odds of the UE 115 gaining access to the shared radio frequency spectrum may be at least satisfactory (e.g., resulting in accessibility).

In other wireless communications networks (e.g., NR networks), however, a UE 115 may be configured to communicate with a base station 105 on multiple carriers in a shared radio frequency spectrum, where each carrier may include multiple sub-bands. Since, in such other wireless networks, each carrier may include multiple sub-bands allocated for communicating with a base station 105, the techniques for contending for access to a shared radio frequency spectrum in LTE networks (e.g., where a carrier contains a single allocated sub-band) may not be applicable to such other wireless networks. In one example, the UE 115 may be capability restricted or configured by the network to only perform uplink transmission on a carrier if LBT procedures succeed for all the allocated sub-bands within the given carrier. In such case, if LBT fails for any allocated sub-band of a carrier, the UE 115 may not be able to perform uplink transmission on the given carrier. Further, the techniques for selecting a carrier or sub-band on which to perform LBT procedures as described for LTE networks may also not be applicable to such other wireless networks. As described herein, a UE 115 in wireless communications system 100 may support efficient techniques for contending for access to a shared radio frequency spectrum for communicating with a base station 105 on multiple carriers, where each carrier may include multiple sub-bands (e.g., while ensuring fairness and accessibility in the shared radio frequency spectrum).

Figure 4:
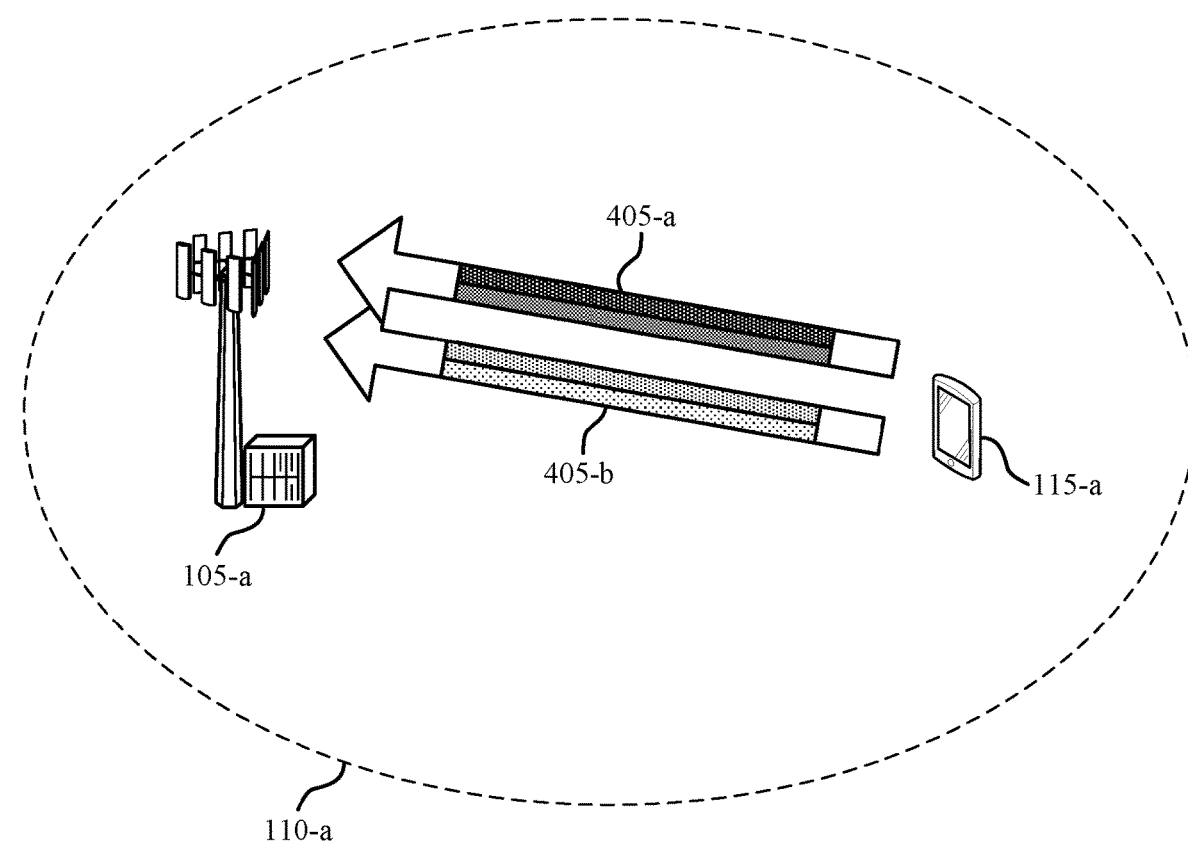
FIG. 4 illustrates an example of a wireless communications system that supports LBT operation with multiple sub-bands in accordance with aspects of the present disclosure.
Figure 4:
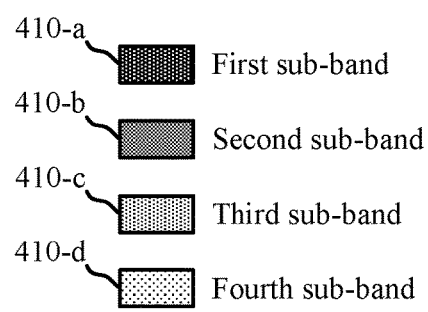

FIG. 4 illustrates an example of a wireless communications system 400 that supports LBT operation with multiple sub-bands in accordance with aspects of the present disclosure. Wireless communications system 400 includes base station 105-a, which may be an example of a base station 105 described with reference to FIGS. 1-3. Wireless communications system 400 also includes UE 115-a, which may be an example of a UE 115 described with reference to FIGS. 1-3. Base station 105-a may provide communication coverage for a respective coverage area 110-a. UE 115-a may transmit uplink signals to base station 105-a on resources of carriers 405 in a shared radio frequency spectrum (e.g., first carrier 405-*a* and second carrier 405-*b*). Wireless communications system 400 may implement aspects of wireless communications system 100. For example, UE 115-*a* in wireless communications system 400 may support efficient techniques for contending for access to a shared radio frequency spectrum for communicating with base station 105-*a* on multiple carriers 405, where each carrier may include multiple sub-bands (e.g., while ensuring fairness and accessibility in the shared radio frequency spectrum.

In the example of FIG. 4, UE 115-*a* may receive an uplink grant for transmitting uplink data to base station 105-*a* on a first sub-band 410-*a* of a carrier 405-*a*, a second sub-band 410-*b* of carrier 405-*a*, and a third sub-band 410-*c* of a carrier 405-*b*. That is, sub-bands 410-*a*, 410-*b*, and 410-*c* may be allocated to the UE 115-*a* for uplink transmissions. As described herein, to gain access to the shared radio frequency spectrum to transmit the uplink data to base station 105-*a*, UE 115-*a* may select a carrier from the set of allocated carriers and at least one of the allocated sub-bands within the carrier (e.g., where not all sub-bands in a carrier may be allocated to the UE 115-*a*) on which to perform a category 4 LBT procedure (or other fairness-based LBT procedure). In some cases, UE 115-*a* may randomly select the at least one of the sub-bands within the carrier on which to perform the category 4 LBT procedure, and, in other cases, UE 115-*a* may receive a control message from base station 105-*a* indicating that UE 115-*a* is to select the at least one sub-band of the multiple allocated sub-bands within the carrier for performing the category LBT procedure (e.g., where the at least one sub-band indicated by the base station 105-*a* may be the same as or different from a sub-band or sub-bands used by the base station 105-*a* for performing category 4 LBT procedures for downlink transmissions). In some cases, the at least one sub-band may be a single sub-band of multiple sub-bands within the selected carrier.

In any case, once UE 115-*a* selects the at least one sub-band for performing the category 4 LBT procedure, UE 115-*a* may perform the category 4 LBT procedure on the at least one sub-band. In addition, UE 115-*a* may also perform category 2 LBT procedures (e.g., or other one-time LBT procedures) on allocated sub-bands within carriers different from the selected carrier. Based on the results of the category 4 procedure and the category 2 procedures, the UE 115-*a* may communicate with the base station 105-*a* on the allocated sub-bands across the multiple carriers in the shared radio frequency spectrum. The techniques described herein provide for various ways for UE 115-*a* to perform LBT procedures when the UE 115-*a* is scheduled to transmit on multiple carriers in a shared radio frequency spectrum, where each carrier may include multiple sub-bands. Further details on these techniques are provided below with reference to FIGS. 5-10.

Figure 5:
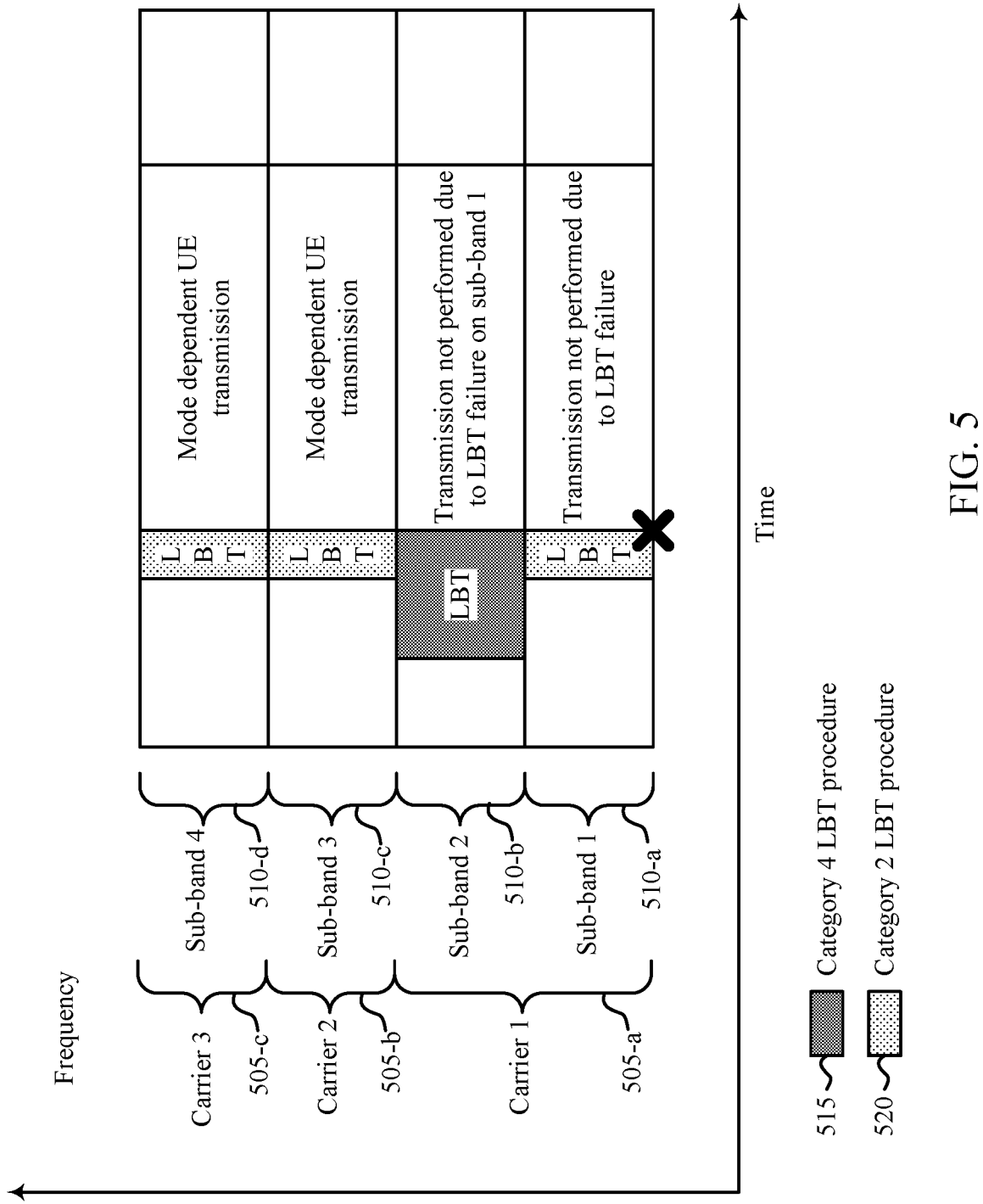
FIGS. 5 through 9 illustrate examples of LBT operation with multiple sub-bands in accordance with aspects of the present disclosure.

FIG. 5 illustrates an example of LBT operation 500 with multiple sub-bands in accordance with aspects of the present disclosure. In the example of FIG. 5, a UE 115 may be scheduled (e.g., may receive an uplink grant) to transmit on multiple sub-bands 510 across multiple carriers 505. For instance, the UE 115 may receive an indication of an allocation for an uplink transmission, where the allocation may include sub-band 1 510-*a* and sub-band 2 510-*b* in carrier 1 505-*a*, sub-band 3 510-*c* in carrier 2 505-*b*, and sub-band 4 510-*d* in carrier 3 505-*c*. Thus, in one aspect of the techniques described herein, UE 115 may select a carrier and select one sub-band of the multiple allocated sub-bands within the carrier on which to perform a category 4 LBT procedure 515, and UE 115 may perform category 2 LBT procedures 520 on the remaining sub-bands within the carrier. Specifically, in the current example, the UE 115 may select carrier 1 505-*a* and sub-band 2 510-*b* within carrier 1 505-*a* on which to perform the category 4 LBT procedure 515, and the UE 115 may perform the category 4 LBT procedure 515 on sub-band 2 510-*b* and perform a category 2 LBT procedure 520 on sub-band 1 510-*a*. In addition, the UE 115 may perform category 2 LBT procedures 520 on sub-band 3 510-*c* and sub-band 4 510-*d* within carrier 2 505-*b* and carrier 3 505-*c* that are different from the selected carrier 1 505-*a*.

In some implementations, if the category 4 LBT procedure 515 for the selected carrier 1 505-*a* fails (e.g., if the category 4 LBT procedure 515 on sub-band 2 510-*b* itself fails) or the UE 115 deems that the LBT procedure for the selected carrier 1 505-*a* has failed (e.g., if the category 2 LBT procedure 520 on sub-band 1 510-*a* fails, despite the results of the category 4 LBT procedure 515 on sub-band 2 510-*b*), the UE 115 may select another sub-band for initiating a subsequent category 4 LBT procedure. In some aspects, the UE 115 may change from one sub-band within the selected carrier to another sub-band within the carrier (e.g., from sub-band 2 510-*b* to sub-band 1 510-*a* in carrier 1 505-*a*) for performing the subsequent category 4 LBT procedure. For example, the UE 115 may perform the category 4 LBT procedure 515 on a sub-band of the same carrier for a duration of time. In other aspects, the UE 115 may select another sub-band randomly within the selected carrier (e.g., which may be the same or a different sub-band) for performing the subsequent category 4 LBT procedure. For example, the UE 115 may perform the category 4 LBT procedure 515 on a sub-band of the same carrier for a duration of time. In yet other aspects, the UE 115 may perform carrier selection and sub-band selection again for the subsequent category 4 LBT procedure (e.g., based on random selection or an indication from the network).

In some cases, the UE 115 may initiate the subsequent category 4 LBT procedure immediately (e.g., within a threshold time) after detecting that the category 4 LBT procedure 515 has failed. In other cases, the UE 115 may initiate the subsequent category 4 LBT procedure for a next uplink allocation (e.g., after a current uplink allocation period for an uplink grant has elapsed, upon receiving an additional uplink grant). In yet other cases, the UE 115 may initiate the subsequent category 4 LBT procedure during an ongoing category 4 LBT procedure 515 (e.g., when the UE 115 determines that the chances of the category 4 LBT procedure 515 passing or being successful are too small). In such cases, as an example, the UE 115 may reselect a carrier or sub-band for performing the category 4 LBT procedure 515 if a threshold duration elapses for an ongoing category 4 LBT procedure 515 and a counter for the LBT procedure has not decremented by at least a predefined number.

If the category 4 LBT procedure 515 on sub-band 2 510-*b* is successful, the category 2 LBT procedure 520 on sub-band 1 510-*a* is successful, and the category 2 LBT procedures 520 on sub-band 3 510-*c* and sub-band 4 510-*d* are successful, the UE 115 may transmit uplink data to a base station 105 on any of sub-bands 510. Alternatively, in some aspects, if the category 4 LBT procedure 515 performed on sub-band 2 510-*b* of the selected carrier 1 505-*a* is successful, the category 2 LBT procedures 520 performed on sub-band 3 510-*c* and sub-band 4 510-*d* are successful, but the category 2 LBT procedure 520 performed on sub-band 1 510-*a* fails, it may be unclear whether the UE 115 is allowed to transmit on sub-band 3 510-*c* and sub-band 4 510-*d*. As described herein, in one example of such aspects (e.g., a first mode), a UE 115 may be configured to transmit or be capable of transmitting (e.g., reusing LTE-LAA techniques) on sub-band 3 510-*c* and sub-band 4 510-*d* (e.g., based on UE capability, limitations at the UE, limitations imposed by a base station scheduler, or limitations on partial transmissions). However, in another example of such aspects (e.g., a second mode), a UE 115 may not be configured to or capable of transmitting on sub-band 3 510-*c* and sub-band 4 510-*d* (e.g., based on UE capability, limitations at the UE, limitations imposed by a base station scheduler, or limitations on partial transmissions). In both examples, the UE 115 may not be capable of or allowed to transmit on a portion of the allocation in at least one carrier (e.g., in sub-band 1 510-*a* or in both sub-band 1 510-*a* and sub-band 2 510-*b*).

Figure 6:
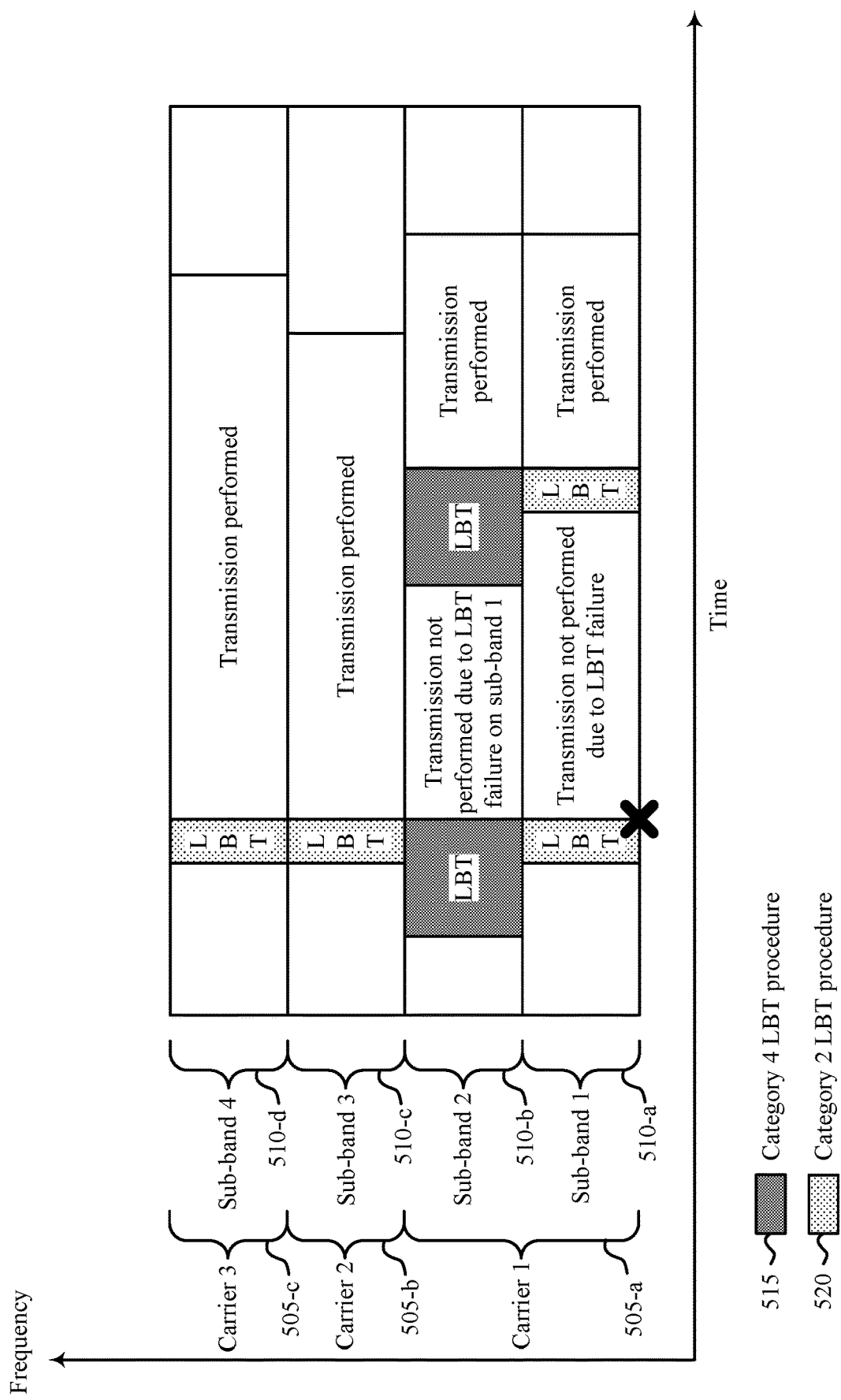
Figure 7:
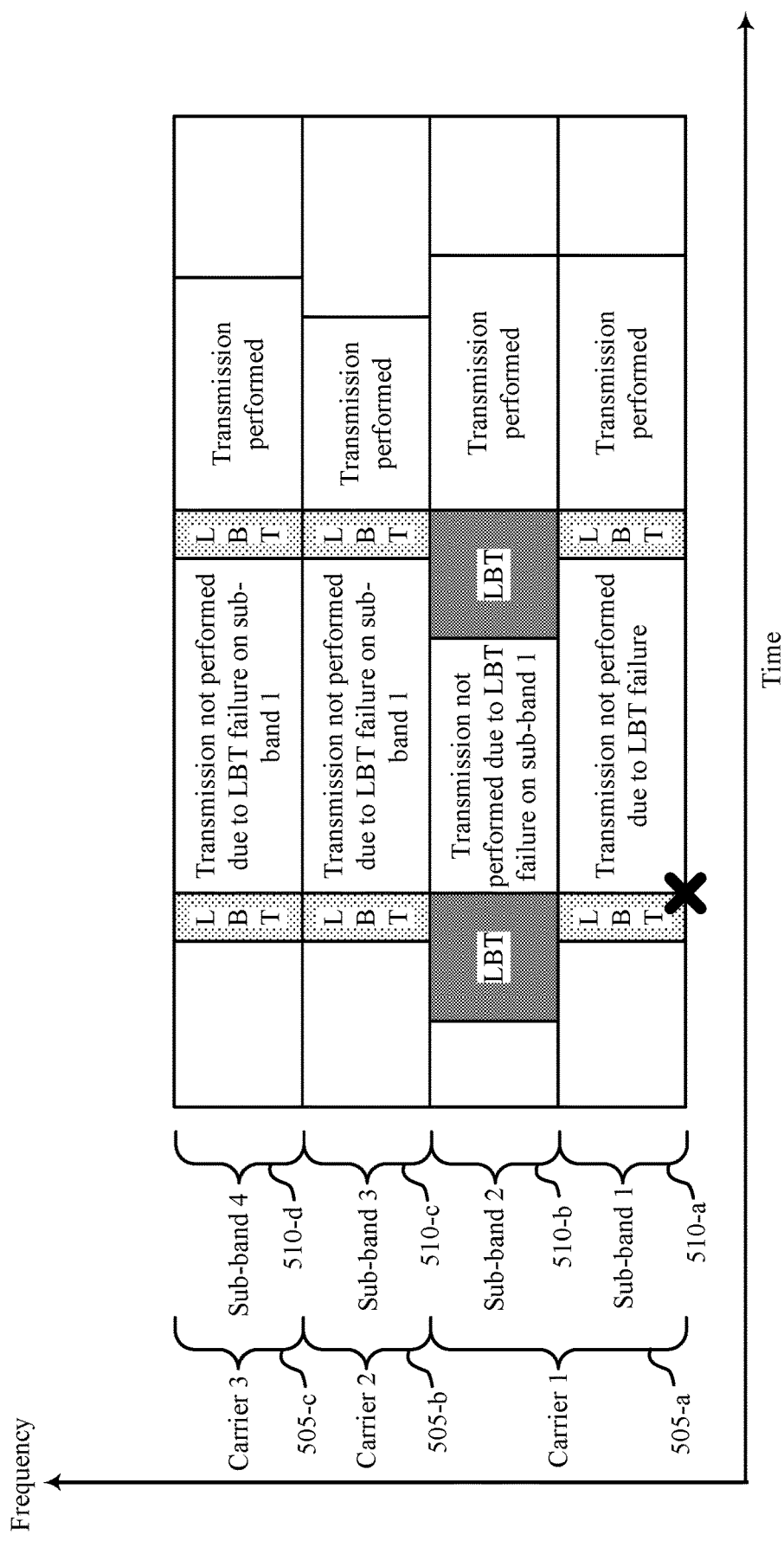

FIG. 6 illustrates an example of a UE 115 transmitting on sub-band 3 510-*c* and sub-band 4 510-*d* before passing a category 2 LBT procedure 520 on sub-band 1 510-*a* of a selected carrier 1 505-*a* (i.e., transmitting on sub-band 3 510-*c* and sub-band 4 510-*d* even though the carrier 1 505-*a* is not used by the UE 115 for transmission). As mentioned above, however, the UE 115 may suppress transmission on sub-band 1 510-*a* or sub-band 2 510-*b* until a category 2 LBT procedure 520 performed on sub-band 1 510-*a* passes and a subsequent category 4 LBT procedure 515 on sub-band 2 510-*b* also passes. FIG. 7 illustrates an example of a UE 115 suppressing transmissions on sub-band 3 510-*c* and sub-band 4 510-*d* before passing a category 2 LBT procedure 520 on sub-band 1 510-*a* of a selected carrier 1 505-*a* (e.g., suppressing transmissions on sub-band 3 510-*c* and sub-band 4 510-*d* since the carrier 1 505-*a* is not used by the UE 115 for transmission). As mentioned above, the UE 115 may also suppress transmission on sub-band 1 510-*a* or sub-band 2 510-*b* until the category 2 LBT procedure 520 performed on sub-band 1 510-*a* passes, a subsequent category 4 LBT procedure 515 on sub-band 2 510-*b* also passes, and subsequent category 2 LBT procedures 520 on sub-band 3 510-*c* and sub-band 510-*d* also pass.

Regardless of whether the UE 115 transmits or suppresses transmission on sub-band 3 510-*c* and sub-band 4 510-*d*, the UE 115 may reattempt the category 2 LBT procedure 520 on sub-band 1 510-*a*. In some cases, the number of subsequent category 2 LBT procedures 520 performed on sub-band 1 510-*a* may be restricted by a number of allowed category 2 LBT attempts, a minimum time duration between two successive category 2 LBT attempts, and a time allotted for category 2 LBT attempts (e.g., until the channel occupancy time (COT) duration for category 4 LBT performed on sub-band 2 510-*b* expires or becomes invalid). In such cases, the UE 115 may not initiate a category 2 LBT procedures 520 if the number of attempts allowed is exceeded, or before a minimum time since the last category 2 LBT procedure 520 passes, or after a time allotted for category 2 LBT procedures 520 expires. Further, as mentioned above, the UE 115 may continue performing a category 4 LBT procedure 515 on sub-band 2 510-*b* during the time that a transmission is not performed on sub-band 1 510-*a* and sub-band 2 510-*b*. Alternatively, the UE 115 may perform an additional LBT check (e.g., for a defer duration or category 2 LBT duration) before initiating transmission on sub-band 1 510-*a* and sub-band 2 510-*b* (e.g., when the subsequent category 2 LBT procedure 520 performed on sub-band 1 510-*a* passes or is successful).

Figure 8:
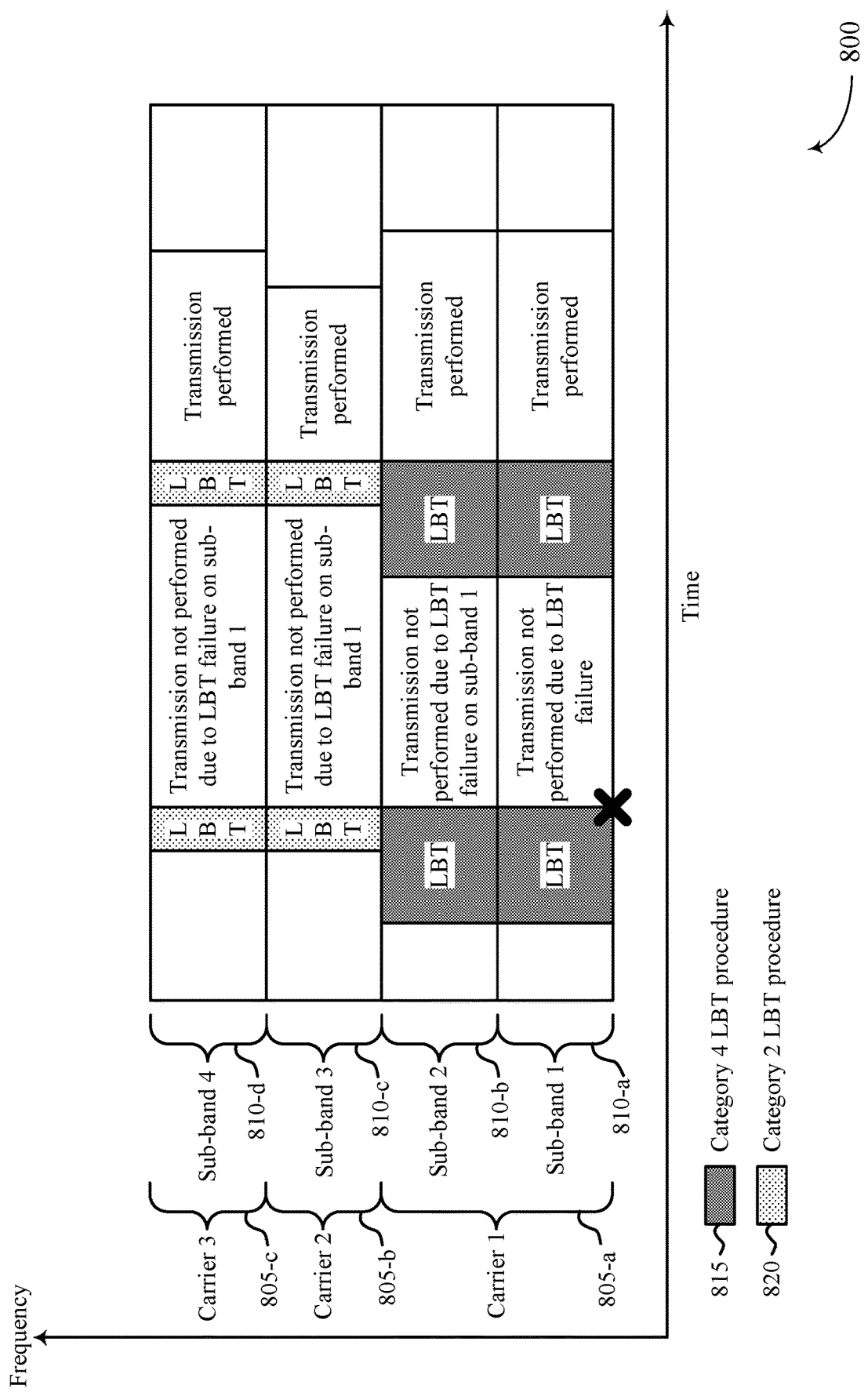

FIG. 8 illustrates an example of LBT operation 800 with multiple sub-bands in accordance with aspects of the present disclosure. In the example of FIG. 8, a UE 115 may be scheduled (e.g., may receive an uplink grant) to transmit on multiple sub-bands 810 across multiple carriers 805. For instance, the UE 115 may receive an indication of an allocation for an uplink transmission, where the allocation may include sub-band 1 810-*a* and sub-band 2 810-*b* in carrier 1 805-*a*, sub-band 3 810-*c* in carrier 2 805-*b*, and sub-band 4 810-*d* in carrier 3 805-*c*. Thus, in one aspect of the techniques described herein, UE 115 may select a carrier from the multiple carriers 805 and may perform concurrent category 4 LBT procedures 815 on at least two of the allocated sub-bands within the carrier (e.g., the UE 115 may perform independent category 4 LBT procedures 815 on all allocated sub-bands of the selected carrier). Specifically, in the current example, the UE 115 may select carrier 1 805-*a* for performing category 4 LBT procedures 815, and the UE 115 may perform the category 4 LBT procedures 815 on sub-band 1 810-*a* and sub-band 2 810-*b* in carrier 1 805-*a*. In addition, the UE 115 may perform category 2 LBT procedures 820 on sub-band 3 810-*c* and sub-band 4 810-*d* within carrier 2 805-*b* and carrier 3 805-*c* that are different from the selected carrier 1 805-*a*.

If any of the category 4 LBT procedures 815 performed on sub-band 1 810-*a* and sub-band 2 810-*b* in the selected carrier 1 805-*a* fails, the UE 115 may suppress transmission on all of the allocated sub-bands 810 across carriers 805. In some cases, UE 115 may then perform subsequent category 4 LBT procedures 815 on sub-band 1 810-*a* and sub-band 2 810-*b* in the selected carrier 1 805-*a* (as shown), or, in other cases, the UE 115 may select another carrier with multiple sub-bands on which the UE 115 may perform category 4 LBT procedures 815. If the subsequent category LBT procedures performed on the sub-band 1 810-*a* and sub-band 2 810-*b* passes, and subsequent category 2 LBT procedures 820 performed on sub-band 3 810-*c* and sub-band 4 810-*d* also pass, the UE 115 may transmit uplink data on sub-bands 810 across carriers 805. Similarly, if the original category 4 LBT procedures 815 performed on sub-band 1 810-*a* and sub-band 2 810-*b* had passed), and the original category 2 LBT procedures 820 performed on sub-band 3 810-*c* and sub-band 4 810-*d* had passed, the UE 115 would have been able to transmit uplink data on sub-bands 810. Thus, using the techniques described with reference to FIG. 8, a UE 115 may transmit uplink data on allocated sub-bands only after all category 4 LBT procedures 815 performed on a selected carrier pass or are successful.

Because the UE 115 may only transmit uplink data on allocated sub-bands after all category 4 LBT procedures 815 performed on sub-bands of a selected carrier pass or are successful, the contention procedure used by the UE 115 to gain access to the shared radio frequency spectrum may be fair (e.g., as opposed to a contention procedure where a UE may transmit uplink data after one of multiple category 4 LBT procedures 815 performed on sub-bands of a selected carrier pass or is successful). If the counter for a category 4 LBT procedure 815 performed on one sub-band within a carrier reaches zero before the counters for other category 4 LBT procedures 815 performed on other sub-bands within the carrier, the UE 115 may continue to decrement the counter for the category 4 LBT procedure 815 until the other category 4 LBT procedures 815 performed on other sub-bands within the carrier pass or are successful, or the UE 115 can stop the counter and may perform channel sensing with a defer duration on the given sub-band just before initiating transmission on the sub-band. It is to be understood that waiting for all category 4 LBT procedures 815 performed on multiple sub-bands of a selected carrier to pass is different from a type-A LBT procedure where a base station 105 may initiate a transmission on a carrier where an LBT procedure has succeeded even if a category 4 LBT procedure 815 is running for other carriers. Since a UE 115 may not be able to perform selective transmission on a subset of sub-bands of a carrier, type-A LBT procedures may not be used across sub-bands of a carrier.

Figure 9:
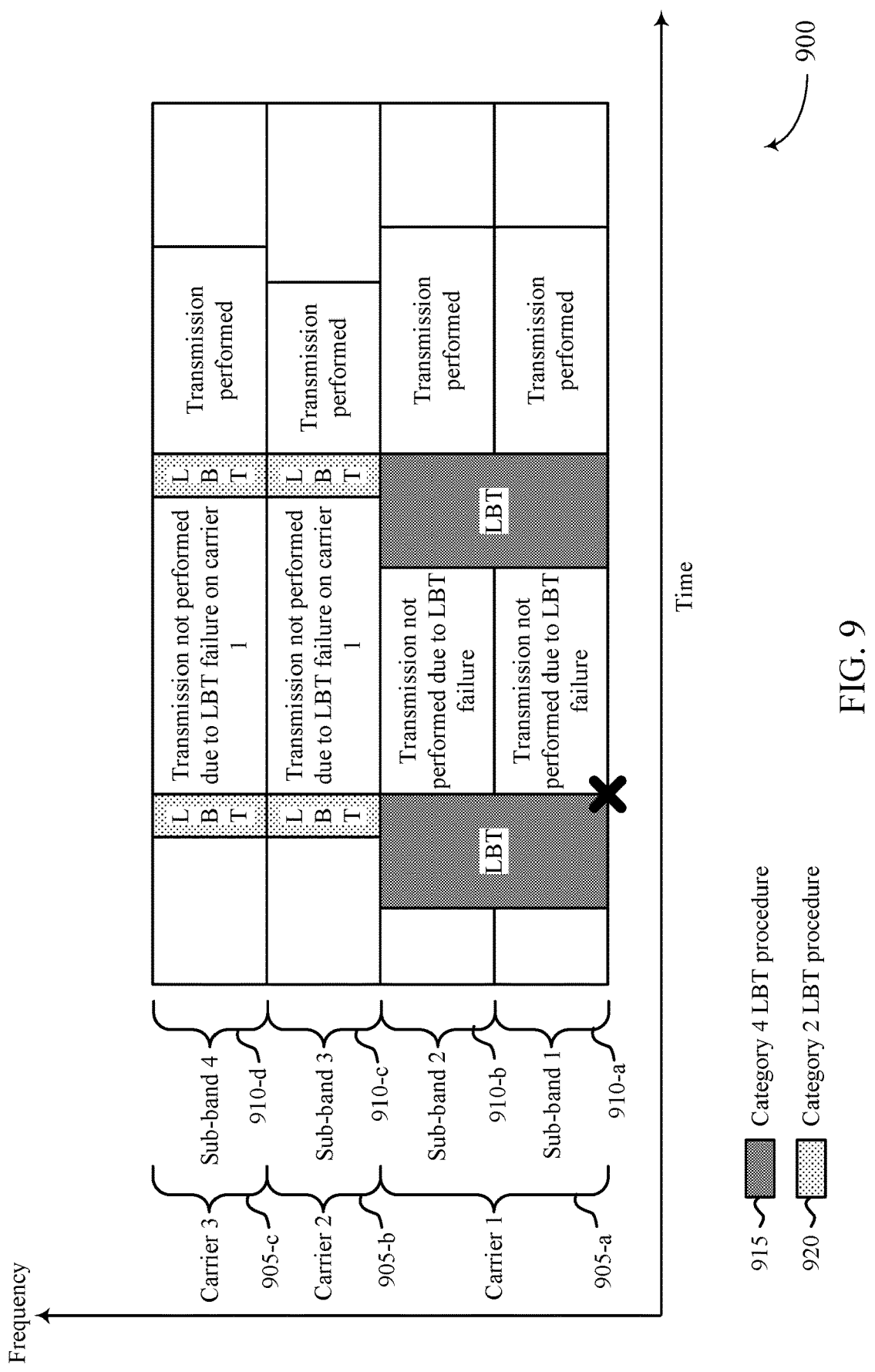

FIG. 9 illustrates an example of LBT operation 900 with multiple sub-bands in accordance with aspects of the present disclosure. In the example of FIG. 9, a UE 115 may be scheduled (e.g., may receive an uplink grant) to transmit on multiple sub-bands 910 across multiple carriers 905. For instance, the UE 115 may receive an indication of an allocation for an uplink transmission, where the allocation may include sub-band 1 910-a and sub-band 2 910-b in carrier 1 905-a, sub-band 3 910-c in carrier 2 905-b, and sub-band 4 910-d in carrier 3 905-c. Thus, in one aspect of the techniques described herein, UE 115 may select a carrier from the multiple carriers 905 and may perform a joint category 4 LBT procedure 915 on all of the sub-bands within the carrier (e.g., a wide-band LBT operation across or spanning all allocated sub-bands in a selected carrier). Specifically, in the current example, the UE 115 may select carrier 1 905-a for performing a joint category 4 LBT procedure 915, and the UE 115 may perform the joint category 4 LBT procedure 915 on sub-band 1 910-a and sub-band 2 910-b in carrier 1 905-a. In addition, the UE 115 may perform category 2 LBT procedures 920 on sub-band 3 910-c and sub-band 4 910-d within carrier 2 905-b and carrier 3 905-c that are different from the selected carrier 1 905-a.

If the joint category 4 LBT procedure 915 performed on sub-band 910-a and sub-band 2 910-b in the selected carrier 1 905-a fails, the UE 115 may suppress transmission on all of the allocated sub-bands 910 across carriers 905. In some cases, UE 115 may then perform a subsequent joint category 4 LBT procedure 915 on sub-band 1 910-a and sub-band 910-b in the selected carrier 1 905-a (as shown), or, in other cases, the UE 115 may select another carrier with multiple sub-bands on which the UE 115 may perform a joint category 4 LBT procedure 915. If the subsequent joint category LBT procedure performed on sub-band 1 910-a and sub-band 2 910-b passes, and subsequent category 2 LBT procedures 920 performed on sub-band 3 910-c and sub-band 4 910-d also pass, the UE 115 may transmit uplink data on sub-bands 910 across carriers 905. Similarly, if the original joint category 4 LBT procedure 915 performed on sub-band 1 910-a and sub-band 2 910-b had passed), and the original category 2 LBT procedures 920 performed on sub-band 3 910-c and sub-band 4 910-d had passed, the UE 115 would have been able to transmit uplink data on sub-bands 910. Thus, using the techniques described with reference to FIG. 9, a UE 115 may transmit uplink data on allocated sub-bands only after a joint category 4 LBT procedure 915 performed on a selected carrier passes or is successful.

Figure 10:
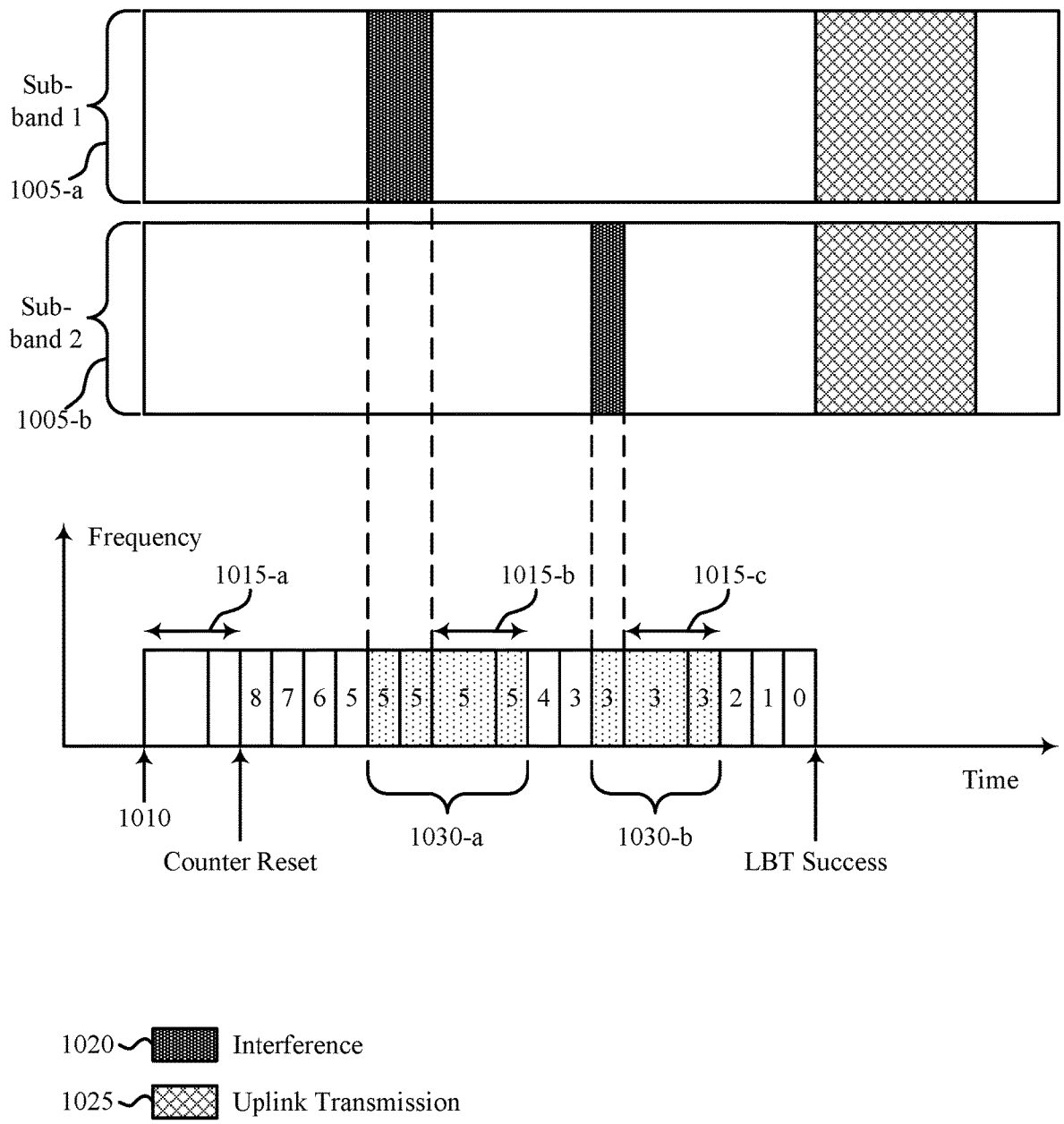
FIG. 10 illustrates an example of a joint category 4 LBT procedure in accordance with aspects of the present disclosure.

FIG. 10 illustrates an example of a joint category 4 LBT procedure 1000 performed on multiple sub-bands 1005 within a single carrier in accordance with aspects of the present disclosure. In the example of FIG. 10, at 1010, a UE 115 may initiate the joint category 4 procedure, and the UE 115 may perform channel sensing on at least all allocated sub-bands within the carrier (i.e., sub-band 1 1005-a and sub-band 2 1005-b) for a defer duration 1015-a. In one example, the UE 115 may perform sensing of each sub-band independently but channel sensing across sub-bands is performed in parallel by the UE 115, in which case the 115 UE may perform channel sensing on all the allocated sub-bands of the selected carrier. In another example, the UE 115 performs a wide-band LBT procedure, where channel sensing is performed by the UE 115 over a contiguous wide bandwidth which includes all the allocated sub-bands. Note that when the UE 115 performs wide-band channel sensing, the UE 115 may also perform channel sensing of sub-bands of the selected carrier where uplink allocation is not provided (e.g., sub-bands that are not allocated for uplink transmissions). After performing the channel sensing and failing to detect energy greater than a threshold on any of the sub-bands 1005, the UE 115 may reset an LBT counter. The UE 115 may then decrement the counter when the UE 115 fails to detect energy greater than the threshold on the sub-bands 1005, and the UE 115 may freeze the counter once the UE 115 detects energy greater than the threshold 1020 on any of the sub-bands 1005 (e.g., the UE 115 may freeze the counter for time period 1030-a including defer duration 1015-b after detecting interference 1020 on sub-band 1 1005-a and time period 1030-b including defer duration 1015-c after detecting interference 1020 on sub-band 2 1005-b).

Thus, the counter for the joint category 4 procedure may be a common category 4 LBT counter for all allocated sub-bands 1005 and may be decremented only if a slot is free or energy greater than a threshold is not detected for all allocated sub-bands of the selected carrier. That is, energy measurements may be performed independently for each sub-band 1005, but the counter for the joint category 4 procedure may be common. Further, a common defer period (e.g., a time period of duration 16 μs+p×9 μs) may be added for energy detection failure in each sub-band based on channel access priority of the selected carrier. Once the UE 115 determines that the counter has been decremented to a zero value, the UE 115 may determine that the LBT procedure is successful. Accordingly, the UE 115 may access the carrier including the sub-bands 1005 in the shared radio frequency spectrum for an uplink transmission 1025 to a base station 105.

In some cases, the counter value for a category 4 LBT procedure performed on a single sub-band may be set based on the contention window parameter or size configured for that sub-band. However, because a joint category 4 LBT procedure may span multiple sub-bands, a UE 115 may not be able to identify an initial counter value for the joint category 4 LBT procedure using the same techniques for identifying an initial counter value for a category 4 LBT procedure performed on a single sub-band. Thus, as described herein, in some examples, the UE 115 may determine the initial counter value for a joint category 4 LBT procedure performed on allocated sub-bands in a carrier based on a largest contention window size among all the contention window sizes configured for the allocated sub-bands (e.g., to maintain fairness, since it may be more difficult for the UE 115 to gain access to a shared radio frequency spectrum with a larger counter value). That is, separate contention window sizes may be maintained for the sub-bands, and may be adjusted based on ACKs and NACKs received for transmissions on the respective sub-bands. For a joint category 4 LBT procedure across sub-bands, the largest of the adjusted contention window sizes may be selected. In other examples, the UE 115 may determine the initial counter value for a joint category 4 LBT procedure performed on allocated sub-bands in a carrier based on a contention window size configured for the sub-bands or otherwise associated with the sub-bands.

In such other examples, the UE 115 may adjust the contention window size configured for all the sub-bands based on ACKs and NACKs received for transmissions on all the allocated sub-bands. For instance, the UE 115 may increment the contention window size when the UE 115 receives a NACK on any of the allocated sub-bands, and the UE 115 may decrement the contention window size when the UE 115 receives an ACK on any of the allocated sub-bands. Because increasing the contention window size and, by extension, the initial counter value for the joint category 4 LBT procedure may make it more difficult for a UE 115 to access a sub-band for uplink transmissions, the UE 115 may be less likely to access sub-bands associated with low signal quality (e.g., since the initial counter value for a category 4 LBT procedure on a sub-band may be high if the UE 115 has received many NACKs on the sub-band). Further, because decreasing the contention window size and, by extension, the initial counter value for the joint category 4 LBT procedure may make it easier for a UE 115 to access a sub-band for uplink transmissions, the UE 115 may be more likely to access sub-bands associated with high signal quality (e.g., since the initial counter value for a category 4 LBT procedure on a sub-band may be high if the UE 115 has received many ACKS on the sub-band).

Figure 11:
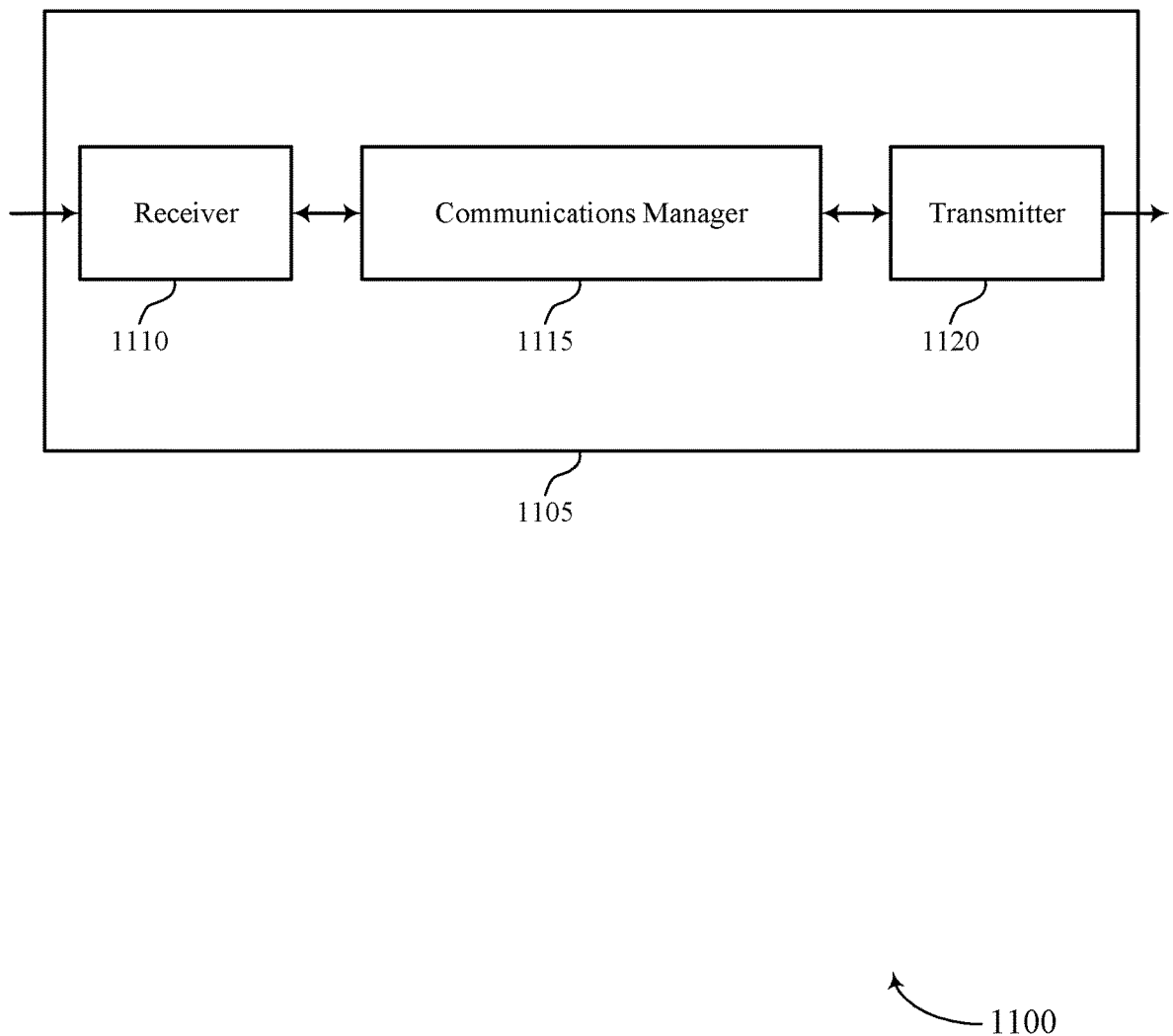
FIGS. 11 and 12 show block diagrams of devices that support LBT operation with multiple sub-bands in accordance with aspects of the present disclosure.

FIG. 11 shows a block diagram 1100 of a device 1105 that supports LBT operation with multiple sub-bands in accordance with aspects of the present disclosure. The device 1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to LBT operation with multiple sub-bands, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify a set of carriers and a set of sub-bands within the set of carriers configured for uplink transmissions from the UE to a base station in a shared radio frequency spectrum, select a carrier from the set of carriers and at least one sub-band of two or more sub-bands within the carrier on which to perform a listen-before-talk procedure of a first type, the two or more sub-bands being a part of the set of sub-bands configured for the uplink transmissions, perform the listen-before-talk procedure of the first type on the at least one sub-band of the two or more sub-bands within the selected carrier, perform one or more listen-before-talk procedures of a second type on sub-bands of the set of sub-bands within carriers of the set of carriers different from the selected carrier, and communicate on the carriers of the set of carriers different from the selected carrier based on the listen-before-talk procedure of the first type and the one or more listen-before-talk procedures of the second type. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
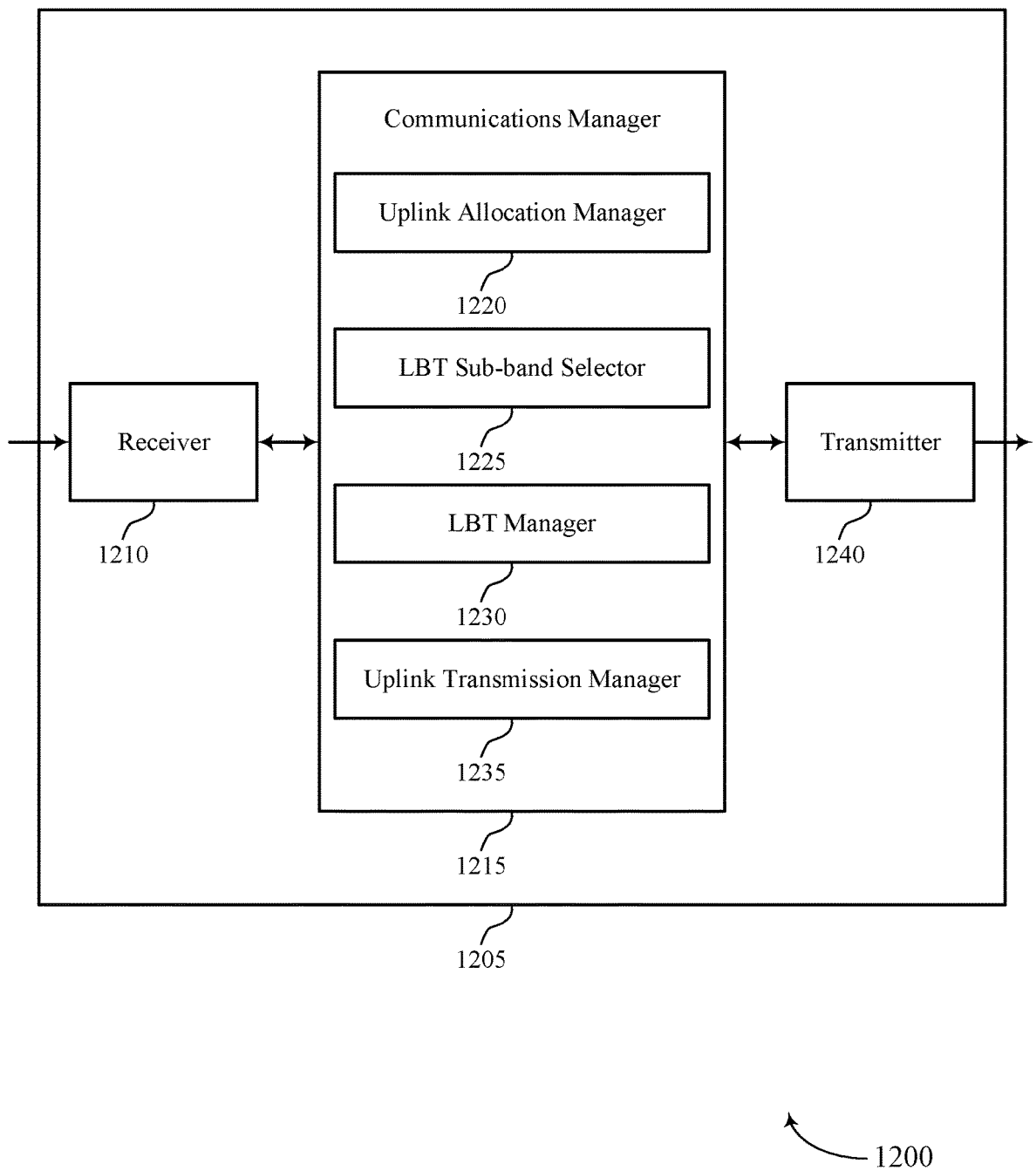

FIG. 12 shows a block diagram 1200 of a device 1205 that supports LBT operation with multiple sub-bands in accordance with aspects of the present disclosure. The device 1205 may be an example of aspects of a device 1105, or a UE 115 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to LBT operation with multiple sub-bands, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an uplink allocation manager 1220, a LBT sub-band selector 1225, a LBT manager 1230, and an uplink transmission manager 1235. The communications manager 1215 may be an example of aspects of the communications manager 1410 described herein.

The uplink allocation manager 1220 may identify a set of carriers and a set of sub-bands within the set of carriers configured for uplink transmissions from the UE to a base station in a shared radio frequency spectrum. The LBT sub-band selector 1225 may select a carrier from the set of carriers and one sub-band of two or more sub-bands within the carrier on which to perform a listen-before-talk procedure of a first type, the two or more sub-bands being a part of the set of sub-bands configured for the uplink transmissions. The LBT manager 1230 may perform the listen-before-talk procedure of the first type on the one sub-band of the two or more sub-bands within the selected carrier and perform one or more listen-before-talk procedures of a second type on sub-bands of the set of sub-bands within carriers of the set of carriers different from the selected carrier. Alternatively, the LBT manager 1230 may perform respective listen-before-talk procedures of a first type on two or more sub-bands within the selected carrier of the plurality of carriers and performing one or more listen-before-talk procedures of a second type on sub-bands of the plurality of sub-bands within carriers of the plurality of carriers different from the selected carrier. The uplink transmission manager 1235 may communicate on the carriers of the set of carriers different from the selected carrier based on the listen-before-talk procedures of the first type and the one or more listen-before-talk procedures of the second type.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
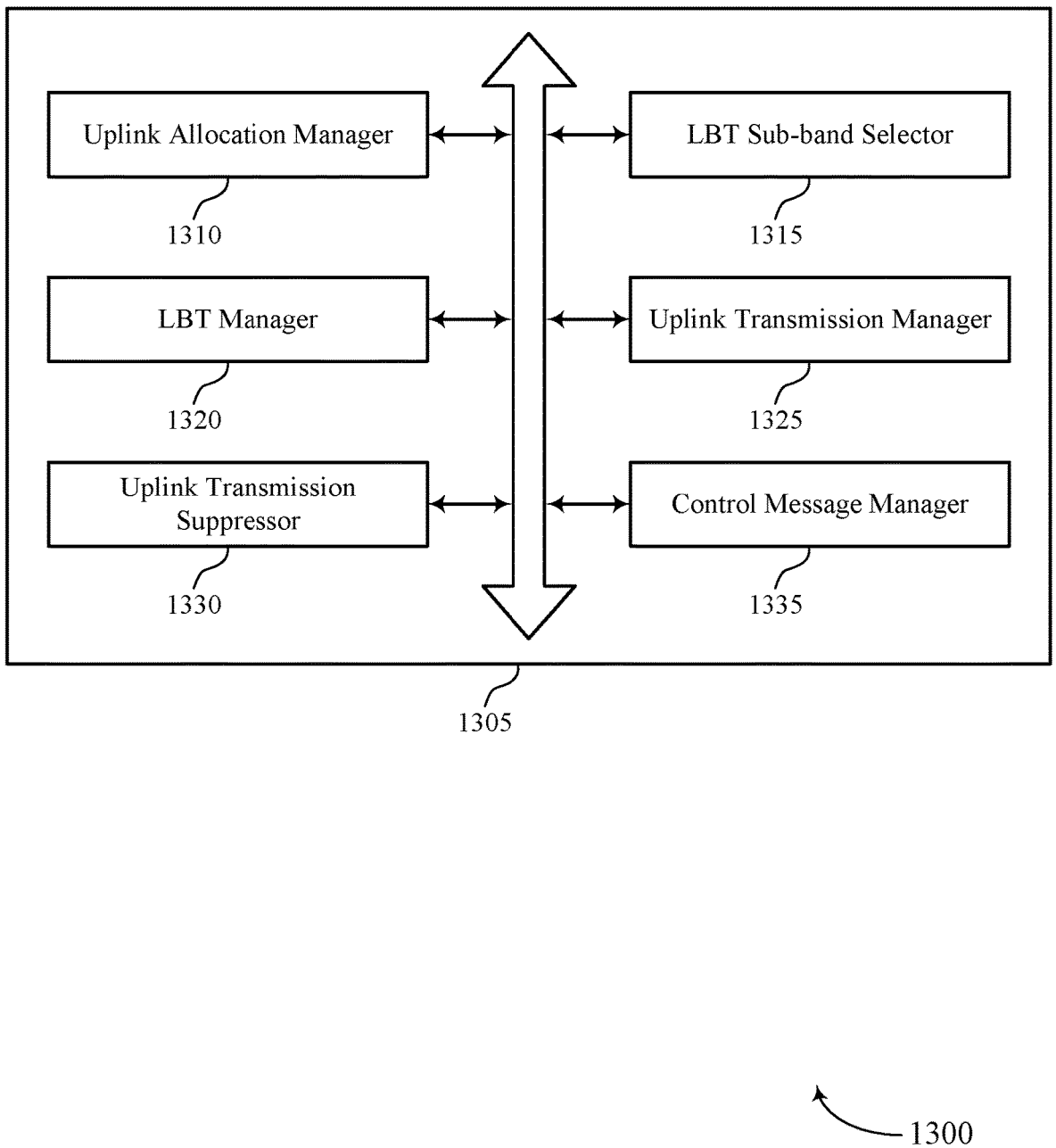
FIG. 13 shows a block diagram of a communications manager that supports LBT operation with multiple sub-bands in accordance with aspects of the present disclosure.

FIG. 13 shows a block diagram 1300 of a communications manager 1305 that supports LBT operation with multiple sub-bands in accordance with aspects of the present disclosure. The communications manager 1305 may be an example of aspects of a communications manager 1115, a communications manager 1215, or a communications manager 1410 described herein. The communications manager 1305 may include an uplink allocation manager 1310, a LBT sub-band selector 1315, a LBT manager 1320, an uplink transmission manager 1325, an uplink transmission suppressor 1330, and a control message manager 1335. Each of these modules may communicate, directly or indirectly, with one another (e.g., via one or more buses).

The uplink allocation manager 1310 may identify a set of carriers and a set of sub-bands within the set of carriers configured for uplink transmissions from the UE to a base station in a shared radio frequency spectrum. The LBT sub-band selector 1315 may select a carrier from the set of carriers and at least one sub-band of two or more sub-bands within the carrier on which to perform a listen-before-talk procedure of a first type, the two or more sub-bands being a part of the set of sub-bands configured for the uplink transmissions. In some examples, the LBT sub-band selector 1315 may select another sub-band of the two or more sub-bands within the selected carrier on which to perform the second listen-before-talk procedure of the first type.

In some examples, the selecting the other sub-band of the two or more sub-bands within the selected carrier is based on determining that a time duration has not expired prior to initiating the second listen-before-talk procedure. In some examples, the LBT sub-band selector 1315 may select another carrier from the set of carriers and a sub-band of the set of sub-bands within the other carrier on which to perform the second listen-before-talk procedure of the first type. In some examples, the LBT sub-band selector 1315 may randomly select the one sub-band of the two or more sub-bands within the carrier on which to perform the listen-before-talk procedure of the first type. In some examples, the LBT sub-band selector 1315 may select the one sub-band of the two or more sub-bands within the carrier on which to perform the listen-before-talk procedure of the first type based on the received indication.

The LBT manager 1320 may perform the listen-before-talk procedure of the first type on the one sub-band of the two or more sub-bands within the selected carrier. In some examples, the LBT manager 1320 may perform one or more listen-before-talk procedures of a second type on sub-bands of the set of sub-bands within carriers of the set of carriers different from the selected carrier. In some examples, the LBT manager 1320 may perform one or more listen-before-talk procedures of the second type on remaining sub-bands of the two or more sub-bands within the selected carrier. In some examples, the LBT manager 1320 may determine that the first listen-before-talk procedure of the first type has failed, that it is likely that the first listen-before-talk procedure of the first type will fail, or that a listen-before-talk procedure of the second type performed on at least one of the remaining sub-bands of the two or more sub-bands within the selected carrier has failed.

In some examples, the LBT manager 1320 may initiate a second listen-before-talk procedure of the first type based on the determining. In some examples, the LBT manager 1320 may initiate the second listen-before-talk procedure of the first type within a threshold amount of time after determining that the first listen-before-talk procedure of the first type failed. In some examples, the LBT manager 1320 may initiate the second listen-before-talk procedure of the first type after receiving an uplink allocation for subsequent uplink transmissions. In some examples, the LBT manager 1320 may initiate the second listen-before-talk procedure during the first listen-before-talk procedure of the first type based on determining that it is likely that the first listen-before-talk procedure of the first type will fail, where the first listen-before-talk procedure of the first type is interrupted and stopped due to the second listen-before-talk procedure of the first type.

In some examples, the LBT manager 1320 may determine that the listen-before-talk procedure of the first type performed on the one sub-band of the two or more sub-bands within the selected carrier is successful and that the one or more listen-before-talk procedures of the second type performed on the remaining sub-bands of the two or more sub-bands within the selected carrier are successful. In some examples, the LBT manager 1320 may determine that a listen-before-talk procedure of the second type performed on a sub-band of the set of sub-bands within a carrier of the set of carriers that is different from the selected carrier is successful. In some examples, the LBT manager 1320 may determine that the listen-before-talk procedure of the first type performed on the one sub-band of the two or more sub-bands within the selected carrier is successful and that a listen-before-talk procedure of the second type performed on at least one of the remaining sub-bands of the two or more sub-bands within the selected carrier has failed.

In some examples, the LBT manager 1320 may determine that a listen-before-talk procedure of the second type performed on a sub-band of the set of sub-bands within a carrier of the set of carriers that is different from the selected carrier is successful. In some examples, the LBT manager 1320 may determine that the listen-before-talk procedure of the first type is successful, a subsequent listen-before-talk procedure of the second type, performed after the suppressing, on the at least one of the remaining sub-bands of the two or more sub-bands within the selected carrier is successful, and the listen-before-talk procedure of the second type performed on the sub-band of the set of sub-bands within the carrier is successful. In some examples, the LBT manager 1320 may initiate a second listen-before-talk procedure of the second type on the at least one of the remaining sub-bands of the two or more sub-bands within the selected carrier.

In some examples, the LBT manager 1320 may perform additional listen-before-talk procedures of the first type on remaining sub-bands of the two or more sub-bands within the selected carrier. For example, the LBT manager 1320 may perform independent listen-before-talk procedures of the first type on a subset which may include more than one up to and including all sub-bands of the two or more sub-bands within the selected carrier. In some examples, the LBT manager 1320 may determine that the listen-before-talk procedure of the first type performed on the at least one sub-band of the two or more sub-bands within the selected carrier is successful and that all of the additional listen-before-talk procedures of the first type performed on the remaining sub-bands of the two or more sub-bands within the selected carrier are successful. In some examples, the LBT manager 1320 may determine that either the listen-before-talk procedure of the first type performed on the at least one sub-band of the two or more sub-bands within the selected carrier has failed or that at least one of the additional listen-before-talk procedures of the first type performed on the remaining sub-bands of the two or more sub-bands within the selected carrier has failed.

In some examples, the LBT manager 1320 may perform a joint listen-before-talk procedure of the first type on all of the two or more sub-bands within the selected carrier. In some examples, the LBT manager 1320 may determine that the joint listen-before-talk procedure of the first type performed on all of the two or more sub-bands within the selected carrier is successful. In some examples, the LBT manager 1320 may determine that the joint listen-before-talk procedure of the first type performed on all of the two or more sub-bands within the selected carrier has failed. In some examples, the LBT manager 1320 may monitor all of the two or more sub-bands within the selected carrier for energy to determine whether the carrier is available for communicating with the base station, where a counter associated with the joint listen-before-talk procedure of the first type is decremented when no energy greater than a threshold is detected on all monitored sub-bands within the selected carrier.

In some cases, the initiating the second listen-before-talk procedure of the second type is based on a number of allowed attempts at the listen before-talk procedure of the second type, a minimum time between attempts at the listen before-talk procedure of the second type, or a time allotted for attempts at the listen-before-talk procedure of the second type. In some cases, an initial value of the counter is selected based on a largest contention window size of a set of contention window sizes associated with respective sub-bands. In some cases, an initial value of the counter is selected based on a contention window size associated with all monitored sub-bands, and where the contention window size is decremented based on acknowledgements received on any of the monitored sub-bands and is incremented based on negative acknowledgements received on any of the monitored sub-bands.

In some cases, the listen-before-talk procedure of the first type includes a fairness-based listen-before-talk procedure for performing channel sensing and backoff and the one or more listen-before-talk procedures of the second type include one-time listen-before-talk procedures. The uplink transmission manager 1325 may communicate on the carriers of the set of carriers different from the selected carrier based on the listen-before-talk procedure of the first type and the one or more listen-before-talk procedures of the second type. In some examples, the uplink transmission manager 1325 may transmit at least a portion of the uplink transmissions on the sub-band within the carrier. In some examples, the uplink transmission manager 1325 may transmit the uplink transmissions or a portion of the uplink transmissions on the sub-band within the carrier. The uplink transmission suppressor 1330 may suppress the uplink transmissions on the sub-band within the carrier. The control message manager 1335 may receive an indication from the base station that the UE is to perform the listen-before-talk procedure of the first type on the at least one sub-band of the two or more sub-bands within the carrier.

Figure 14:
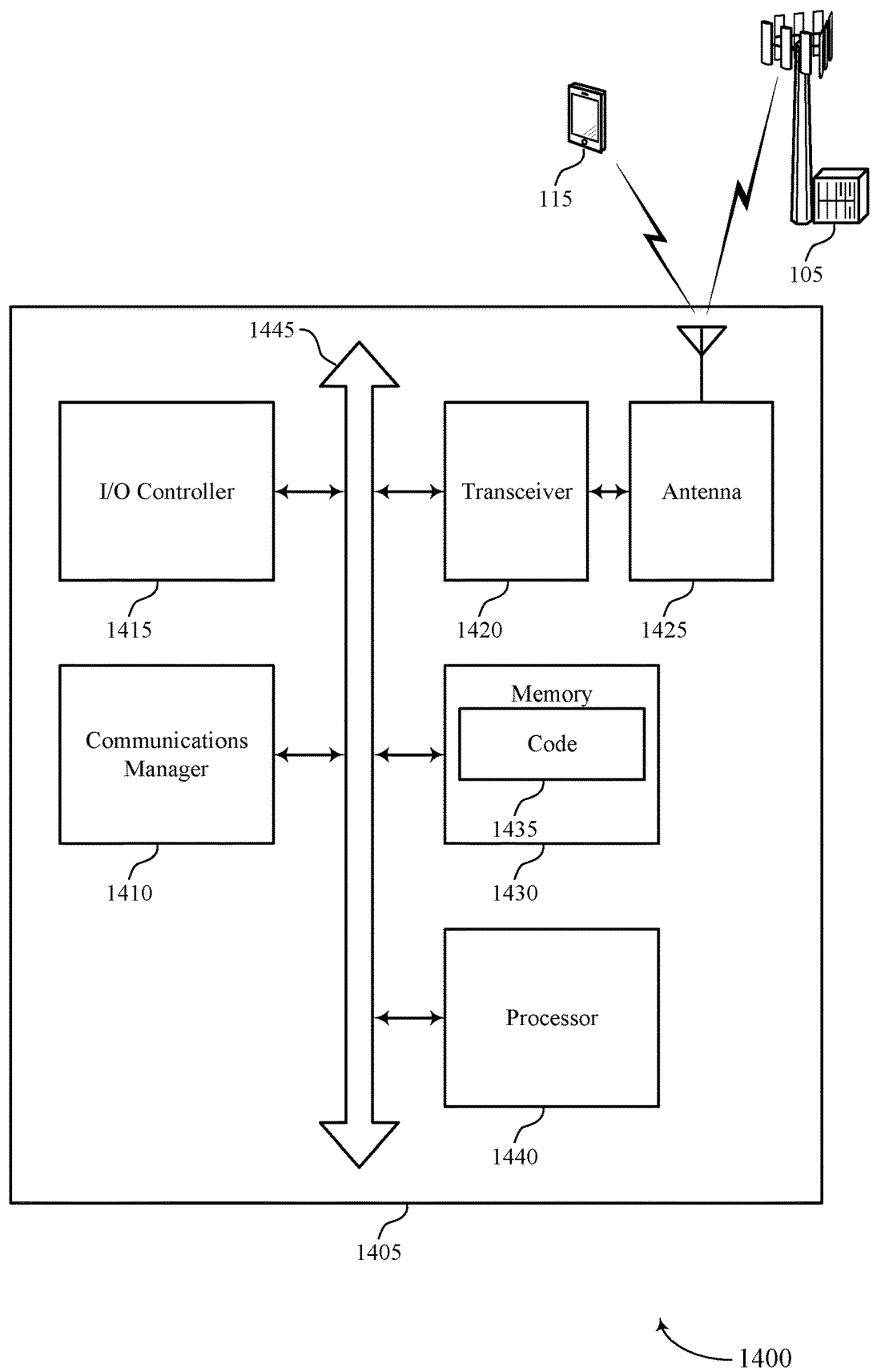
FIG. 14 shows a diagram of a system including a device that supports LBT operation with multiple sub-bands in accordance with aspects of the present disclosure.

FIG. 14 shows a diagram of a system 1400 including a device 1405 that supports LBT operation with multiple sub-bands in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

The communications manager 1410 may identify a set of carriers and a set of sub-bands within the set of carriers configured for uplink transmissions from the UE to a base station in a shared radio frequency spectrum, select a carrier from the set of carriers and one sub-band of two or more sub-bands within the carrier on which to perform a listen-before-talk procedure of a first type, the two or more sub-bands being a part of the set of sub-bands configured for the uplink transmissions, perform the listen-before-talk procedure of the first type on the one sub-band of the two or more sub-bands within the selected carrier, and perform one or more listen-before-talk procedures of a second type on sub-bands of the set of sub-bands within carriers of the set of carriers different from the selected carrier. Alternatively, the communications manager 1410 may perform respective listen-before-talk procedures of a first type on two or more sub-bands within the selected carrier of the plurality of carriers and performing one or more listen-before-talk procedures of a second type on sub-bands of the plurality of sub-bands within carriers of the plurality of carriers different from the selected carrier. The communications manager 1410 may communicate on the carriers of the set of carriers different from the selected carrier based on the listen-before-talk procedures of the first type and the one or more listen-before-talk procedures of the second type.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM and ROM. The memory 1430 may store computer-readable, computer-executable code 1435 including instructions that, when executed, cause the processor to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting LBT operation with multiple sub-bands).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
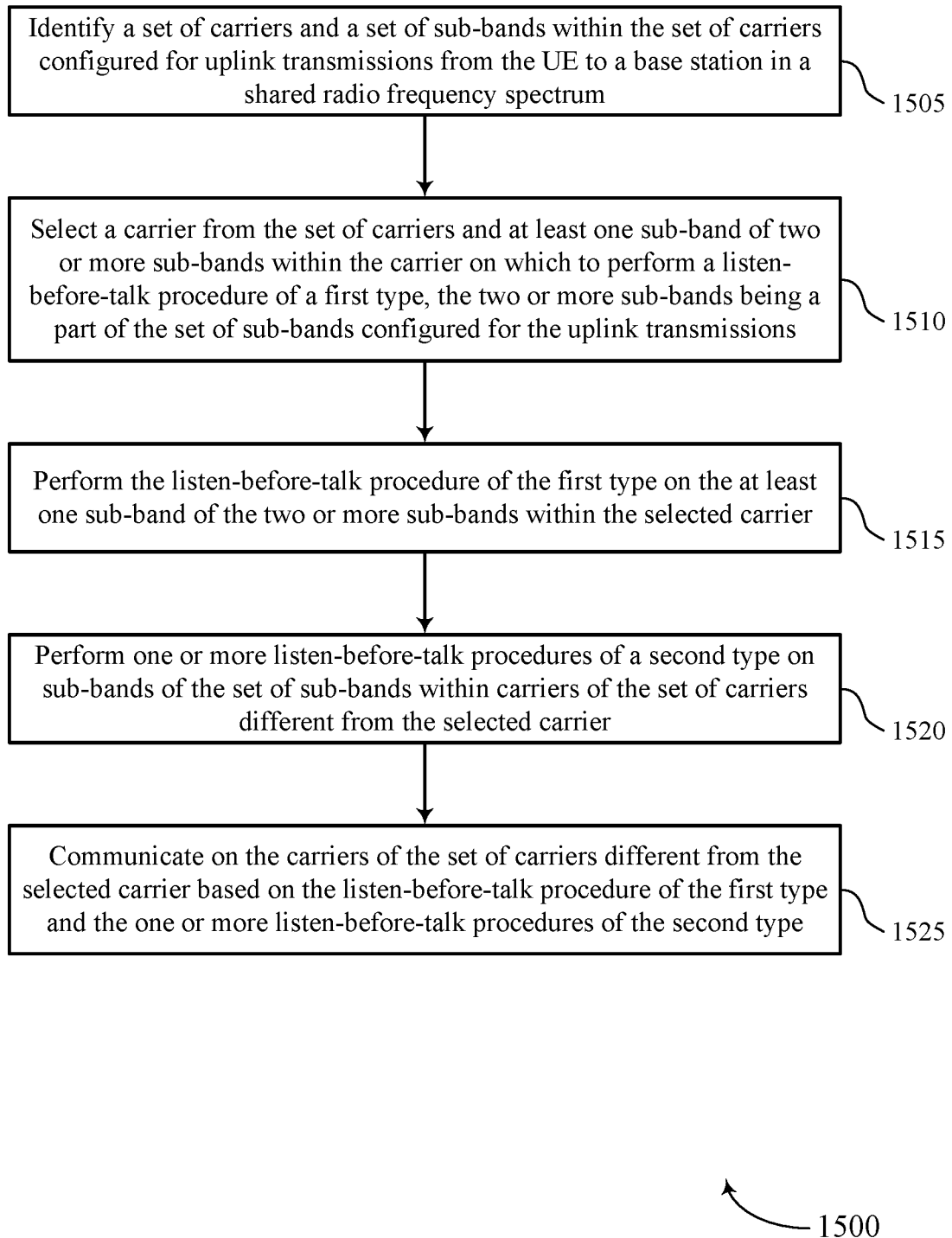
FIG. 15 shows a flowchart illustrating methods that support LBT operation with multiple sub-bands in accordance with aspects of the present disclosure.

FIG. 15 shows a flowchart illustrating a method 1500 that supports LBT operation with multiple sub-bands in accordance with aspects of the present disclosure. The operations of method 1500 may be implemented by a UE 115 or its components as described herein. For example, the operations of method 1500 may be performed by a communications manager as described with reference to FIGS. 11 through 14. In some examples, a UE may execute a set of instructions to control the functional elements of the UE to perform the functions described herein. Additionally, or alternatively, a UE may perform aspects of the functions described herein using special-purpose hardware.

At 1505, the UE may identify a set of carriers and a set of sub-bands within the set of carriers configured for uplink transmissions from the UE to a base station in a shared radio frequency spectrum. The operations of 1505 may be performed according to the methods described herein. In some examples, aspects of the operations of 1505 may be performed by an uplink allocation manager as described with reference to FIGS. 11 through 14.

At 1510, the UE may select a carrier from the set of carriers and at least one sub-band of two or more sub-bands within the carrier on which to perform a listen-before-talk procedure of a first type, the two or more sub-bands being a part of the set of sub-bands configured for the uplink transmissions. The operations of 1510 may be performed according to the methods described herein. In some examples, aspects of the operations of 1510 may be performed by a LBT sub-band selector as described with reference to FIGS. 11 through 14.

At 1515, the UE may perform the listen-before-talk procedure of the first type on the at least one sub-band of the two or more sub-bands within the selected carrier. The operations of 1515 may be performed according to the methods described herein. In some examples, aspects of the operations of 1515 may be performed by a LBT manager as described with reference to FIGS. 11 through 14.

At 1520, the UE may perform one or more listen-before-talk procedures of a second type on sub-bands of the set of sub-bands within carriers of the set of carriers different from the selected carrier. The operations of 1520 may be performed according to the methods described herein. In some examples, aspects of the operations of 1520 may be performed by a LBT manager as described with reference to FIGS. 11 through 14.

At 1525, the UE may communicate on the carriers of the set of carriers different from the selected carrier based on the listen-before-talk procedure of the first type and the one or more listen-before-talk procedures of the second type. The operations of 1525 may be performed according to the methods described herein. In some examples, aspects of the operations of 1525 may be performed by an uplink transmission manager as described with reference to FIGS. 11 through 14.

Example 1 is a method for wireless communication at a UE that includes identifying a plurality of carriers and a plurality of sub-bands within the plurality of carriers configured for uplink transmissions from the UE to a base station in a shared radio frequency spectrum, selecting a carrier from the plurality of carriers and at least one sub-band of two or more sub-bands within the carrier on which to perform a listen-before-talk procedure of a first type, the two or more sub-bands being a part of the plurality of sub-bands configured for the uplink transmissions, performing the listen-before-talk procedure of the first type on the at least one sub-band of the two or more sub-bands within the selected carrier, performing one or more listen-before-talk procedures of a second type on sub-bands of the plurality of sub-bands within carriers of the plurality of carriers different from the selected carrier.

In example 2, the at least one sub-band of the two or more sub-bands within the selected carrier comprises one sub-band of the two or more sub-bands within the selected carrier, and the method of example 1 includes performing one or more listen-before-talk procedures of the second type on remaining sub-bands of the two or more sub-bands within the selected carrier. In example 3, the listen-before-talk procedure of the first type comprises a first listen-before-talk procedure of the first type, and the method of examples 1 and 2 includes determining that the first listen-before-talk procedure of the first type may have failed, that it may be likely that the first listen-before-talk procedure of the first type will fail, or that a listen-before-talk procedure of the second type performed on at least one of the remaining sub-bands of the two or more sub-bands within the selected carrier may have failed, and initiating a second listen-before-talk procedure of the first type based on the determining.

In example 4, the method of examples 1-3 includes initiating the second listen-before-talk procedure of the first type within a threshold amount of time after determining that the first listen-before-talk procedure of the first type failed. In example 5, the method of examples 1-3 includes initiating the second listen-before-talk procedure of the first type after receiving an uplink allocation for subsequent uplink transmissions. In example 6, the method of examples 1-3 includes initiating the second listen-before-talk procedure during the first listen-before-talk procedure of the first type based on determining that it may be likely that the first listen-before-talk procedure of the first type will fail, where the first listen-before-talk procedure of the first type may be interrupted and stopped due to the second listen-before-talk procedure of the first type.

In example 7, the method of examples 1-6 includes selecting another sub-band of the two or more sub-bands within the selected carrier on which to perform the second listen-before-talk procedure of the first type. In example 8, the selecting the other sub-band of the two or more sub-bands within the selected carrier may be based on determining that a time duration may have not expired prior to initiating the second listen-before-talk procedure. In example 9, the method of examples 1-8 includes selecting another carrier from the set of carriers and a sub-band of the set of sub-bands within the other carrier on which to perform the second listen-before-talk procedure of the first type.

In example 10, the method of examples 1 and 2 includes determining that the listen-before-talk procedure of the first type performed on the at least one sub-band of the two or more sub-bands within the selected carrier may be successful and that the one or more listen-before-talk procedures of the second type performed on the remaining sub-bands of the two or more sub-bands within the selected carrier may be successful, determining that a listen-before-talk procedure of the second type performed on a sub-band of the set of sub-bands within a carrier of the set of carriers that may be different from the selected carrier may be successful, and transmitting at least a portion of the uplink transmissions on the sub-band within the carrier.

In example 11, the method of examples 1 and 2 includes determining that the listen-before-talk procedure of the first type performed on the at least one sub-band of the two or more sub-bands within the selected carrier may be successful and that a listen-before-talk procedure of the second type performed on at least one of the remaining sub-bands of the two or more sub-bands within the selected carrier may have failed, and determining that a listen-before-talk procedure of the second type performed on a sub-band of the set of sub-bands within a carrier of the set of carriers that may be different from the selected carrier may be successful.

In example 12, the method of examples 1, 2, and 11 includes transmitting at least a portion of the uplink transmissions on the sub-band within the carrier. In example 13, the method of examples 1, 2, and 11 includes suppressing the uplink transmissions on the sub-band within the carrier. In example 14, the methods of examples 1, 2, 11, and 13 includes determining that the listen-before-talk procedure of the first type may be successful, a subsequent listen-before-talk procedure of the second type, performed after the suppressing, on the at least one of the remaining sub-bands of the two or more sub-bands within the selected carrier may be successful, and the listen-before-talk procedure of the second type performed on the sub-band of the set of sub-bands within the carrier may be successful, and transmitting at least a portion of the uplink transmissions on the sub-band within the carrier.

In example 15, the methods of examples 1, 2, and 11 includes initiating a second listen-before-talk procedure of the second type on the at least one of the remaining sub-bands of the two or more sub-bands within the selected carrier. In example 16, the initiating the second listen-before-talk procedure of the second type is based on a number of allowed attempts at the listen before-talk procedure of the second type, a minimum time between attempts at the listen before-talk procedure of the second type, or a time allotted for attempts at the listen-before-talk procedure of the second type. In example 17, the at least one sub-band of the two or more sub-bands within the selected carrier comprises one sub-band of the two or more sub-bands within the selected carrier, and the method of example 1 includes performing additional listen-before-talk procedures of the first type on remaining sub-bands of the two or more sub-bands within the selected carrier.

In example 18, the method of examples 1 and 17 includes determining that the listen-before-talk procedure of the first type performed on the at least one sub-band of the two or more sub-bands within the selected carrier may be successful and that all of the additional listen-before-talk procedures of the first type performed on the remaining sub-bands of the two or more sub-bands within the selected carrier may be successful, determining that a listen-before-talk procedure of the second type performed on a sub-band of the set of sub-bands within a carrier of the set of carriers that may be different from the selected carrier may be successful, and transmitting at least a portion of the uplink transmissions on the sub-band within the carrier.

In example 19, the method of examples 1 and 17 includes determining that either the listen-before-talk procedure of the first type performed on the at least one sub-band of the two or more sub-bands within the selected carrier may have failed or that at least one of the additional listen-before-talk procedures of the first type performed on the remaining sub-bands of the two or more sub-bands within the selected carrier may have failed, determining that a listen-before-talk procedure of the second type performed on a sub-band of the set of sub-bands within a carrier of the set of carriers that may be different from the selected carrier may be successful, and suppressing the uplink transmissions on the sub-band within the carrier. In example 20, the at least one sub-band of the two or more sub-bands within the selected carrier comprises all of the two or more sub-bands within the selected carrier, and the method of example 1 includes performing a joint listen-before-talk procedure of the first type on all of the two or more sub-bands within the selected carrier.

In example 21, the method of examples 1 and 20 includes determining that the joint listen-before-talk procedure of the first type performed on all of the two or more sub-bands within the selected carrier may be successful, determining that a listen-before-talk procedure of the second type performed on a sub-band of the set of sub-bands within a carrier of the set of carriers that may be different from the selected carrier may be successful, and transmitting the uplink transmissions or a portion of the uplink transmissions on the sub-band within the carrier.

In example 22, the method of examples 1 and 20 includes determining that the joint listen-before-talk procedure of the first type performed on all of the two or more sub-bands within the selected carrier may have failed, determining that a listen-before-talk procedure of the second type performed on a sub-band of the set of sub-bands within a carrier of the set of carriers that may be different from the selected carrier may be successful, and suppressing the uplink transmissions on the sub-band within the carrier. In example 23, the method of examples 1 and 20 includes monitoring all of the two or more sub-bands within the selected carrier for energy to determine whether the carrier may be available for communicating with the base station, where a counter associated with the joint listen-before-talk procedure of the first type may be decremented when no energy greater than a threshold may be detected on all monitored sub-bands within the selected carrier.

In example 24, an initial value of the counter may be selected based on a largest contention window size of a set of contention window sizes associated with respective sub-bands. In example 25, an initial value of the counter may be selected based on a contention window size associated with all monitored sub-bands, and where the contention window size may be decremented based on acknowledgements received on any of the monitored sub-bands and may be incremented based on negative acknowledgements received on any of the monitored sub-bands.

In example 26, the method of examples 1-25 includes randomly selecting the at least one sub-band of the two or more sub-bands within the carrier on which to perform the listen-before-talk procedure of the first type. In example 27, the method of examples 1-25 includes receiving an indication from the base station that the UE may be to perform the listen-before-talk procedure of the first type on the at least one sub-band of the two or more sub-bands within the carrier, and selecting the at least one sub-band of the two or more sub-bands within the carrier on which to perform the listen-before-talk procedure of the first type based on the received indication. In example 28, the listen-before-talk procedure of the first type includes a fairness-based listen-before-talk procedure for performing channel sensing and backoff and the one or more listen-before-talk procedures of the second type include one-time listen-before-talk procedures.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
    a processor,
    memory in electronic communication with the processor; and
    instructions stored in the memory and executable by the processor to cause the apparatus to:
        identify a plurality of carriers and a plurality of sub-bands within the plurality of carriers configured for uplink transmissions from the UE to a base station in a shared radio frequency spectrum;
        select a carrier from the plurality of carriers and one sub-band of two or more sub-bands within the carrier on which to perform a listen-before-talk procedure of a first type, the two or more sub-bands being a part of the plurality of sub-bands configured for the uplink transmissions;
        perform the listen-before-talk procedure of the first type on the one sub-band of the two or more sub-bands within the selected carrier;
        perform one or more listen-before-talk procedures of a second type on sub-bands of the plurality of sub-bands within carriers of the plurality of carriers different from the selected carrier;
        perform one or more listen-before-talk procedures of the second type on remaining sub-bands of the two or more sub-bands within the selected carrier;
        determine that at least one listen-before-talk procedure of the first type on the one sub-band or of the second type on the remaining sub-bands has failed; and
        communicate on the carriers of the plurality of carriers different from the selected carrier based at least in part on the listen-before-talk procedure of the first type and the one or more listen-before-talk procedures of the second type, wherein communicating on the carriers of the plurality of carriers different from the selected carrier comprises suppressing communication on the selected carrier based at least in part on determining that the at least one listen-before-talk procedure on sub-bands of the selected carrier has failed.

2. The apparatus of claim 1, wherein the listen-before-talk procedure of the first type comprises a first listen-before-talk procedure of the first type, wherein the instructions are further executable by the processor to cause the apparatus to:
    initiate a second listen-before-talk procedure of the first type based at least in part on the determining.

3. The apparatus of claim 2, wherein the instructions are further executable by the processor to cause the apparatus to:
    initiate the second listen-before-talk procedure of the first type within a threshold amount of time after determining that the first listen-before-talk procedure of the first type failed.

4. The apparatus of claim 2, wherein the instructions are further executable by the processor to cause the apparatus to:
    initiate the second listen-before-talk procedure of the first type after receiving an uplink allocation for subsequent uplink transmissions.

5. The apparatus of claim 2, wherein the instructions are further executable by the processor to cause the apparatus to:
initiate the second listen-before-talk procedure during the first listen-before-talk procedure of the first type based at least in part on a determined likelihood indicates that the first listen-before-talk procedure of the first type will fail, wherein the first listen-before-talk procedure of the first type is interrupted and stopped due to the second listen-before-talk procedure of the first type.

6. The apparatus of claim 2, wherein the instructions are further executable by the processor to cause the apparatus to:
select another sub-band of the two or more sub-bands within the selected carrier on which to perform the second listen-before-talk procedure of the first type.

7. The apparatus of claim 2, wherein the wherein the instructions executable by the processor to cause the apparatus to select the other sub-band of the two or more sub-bands within the selected carrier select the other sub-band based at least in part on determining that a time duration has not expired prior to initiating the second listen-before-talk procedure.

8. The apparatus of claim 2, wherein the instructions are further executable by the processor to cause the apparatus to:
select another carrier from the plurality of carriers and a sub-band of the plurality of sub-bands within the other carrier on which to perform the second listen-before-talk procedure of the first type.

9. The apparatus of claim 1, wherein the instructions are further executable by the processor to cause the apparatus to:
determine that the listen-before-talk procedure of the first type performed on the at least one sub-band of the two or more sub-bands within the selected carrier is successful and that the one or more listen-before-talk procedures of the second type performed on the remaining sub-bands of the two or more sub-bands within the selected carrier are successful;
determine that a listen-before-talk procedure of the second type performed on a sub-band of the plurality of sub-bands within a carrier of the plurality of carriers that is different from the selected carrier is successful; and
transmit at least a portion of the uplink transmissions on the sub-band within the carrier.

10. The apparatus of claim 1, wherein the instructions are further executable by the processor to cause the apparatus to:
determine that the listen-before-talk procedure of the first type performed on the at least one sub-band of the two or more sub-bands within the selected carrier is successful and that a listen-before-talk procedure of the second type performed on at least one of the remaining sub-bands of the two or more sub-bands within the selected carrier has failed; and
determine that a listen-before-talk procedure of the second type performed on a sub-band of the plurality of sub-bands within a carrier of the plurality of carriers that is different from the selected carrier is successful.

11. The apparatus of claim 10, wherein the instructions are further executable by the processor to cause the apparatus to:
transmit at least a portion of the uplink transmissions on the sub-band within the carrier.

12. The apparatus of claim 10, wherein the instructions are further executable by the processor to cause the apparatus to:
suppress the uplink transmissions on the sub-band within the carrier.

13. The apparatus of claim 12, wherein the instructions are further executable by the processor to cause the apparatus to:
determine that the listen-before-talk procedure of the first type is successful, a subsequent listen-before-talk procedure of the second type, performed after the suppressing, on the at least one of the remaining sub-bands of the two or more sub-bands within the selected carrier is successful, and the listen-before-talk procedure of the second type performed on the sub-band of the plurality of sub-bands within the carrier is successful; and
transmit at least a portion of the uplink transmissions on the sub-band within the carrier.

14. The apparatus of claim 10, wherein the instructions are further executable by the processor to cause the apparatus to:
initiate a second listen-before-talk procedure of the second type on the at least one of the remaining sub-bands of the two or more sub-bands within the selected carrier.

15. The apparatus of claim 14, wherein the instructions executable by the processor to cause the apparatus to initiate the second listen-before-talk procedure of the second type is based at least in part on a number of allowed attempts at the listen before-talk procedure of the second type, a minimum time between attempts at the listen before-talk procedure of the second type, or a time allotted for attempts at the listen-before-talk procedure of the second type.

16. The apparatus of claim 1, wherein the at least one sub-band of the two or more sub-bands within the selected carrier comprises all of the two or more sub-bands within the selected carrier, and wherein performing the listen-before-talk procedure of the first type on all of the two or more sub-bands within the selected carrier comprises additional instructions executable by the processor to cause the apparatus to:
perform a joint listen-before-talk procedure of the first type on all of the two or more sub-bands within the selected carrier.

17. The apparatus of claim 16, wherein the instructions are further executable by the processor to cause the apparatus to:
determine that the joint listen-before-talk procedure of the first type performed on all of the two or more sub-bands within the selected carrier is successful;
determine that a listen-before-talk procedure of the second type performed on a sub-band of the plurality of sub-bands within a carrier of the plurality of carriers that is different from the selected carrier is successful; and
transmit the uplink transmissions or a portion of the uplink transmissions on the sub-band within the carrier.

18. The apparatus of claim 16, wherein the instructions are further executable by the processor to cause the apparatus to:
determine that the joint listen-before-talk procedure of the first type performed on all of the two or more sub-bands within the selected carrier has failed;
determine that a listen-before-talk procedure of the second type performed on a sub-band of the plurality of sub-bands within a carrier of the plurality of carriers that is different from the selected carrier is successful; and
suppress the uplink transmissions on the sub-band within the carrier.

19. The apparatus of claim 16, wherein the instructions executable by the processor to cause the apparatus to perform the joint listen-before-talk procedure of the first type on all of the two or more sub-bands within the selected carrier comprise instructions executable by the processor to cause the apparatus to:
monitor all of the two or more sub-bands within the selected carrier for energy to determine whether the carrier is available for communicating with the base station, wherein a counter associated with the joint listen-before-talk procedure of the first type is decremented when no energy greater than a threshold is detected on all monitored sub-bands within the selected carrier.

20. The apparatus of claim 19, wherein an initial value of the counter is selected based at least in part on a largest contention window size of a set of contention window sizes associated with respective sub-bands.

21. The apparatus of claim 19, wherein an initial value of the counter is selected based at least in part on a contention window size associated with all monitored sub-bands, and wherein the contention window size is decremented based at least in part on acknowledgements received on any of the monitored sub-bands and is incremented based at least in part on negative acknowledgements received on any of the monitored sub-bands.

22. The apparatus of claim 1, wherein the instructions executable by the processor to cause the apparatus to select the at least one sub-band of the two or more sub-bands within the carrier comprise instructions executable by the processor to cause the apparatus to:
randomly select the at least one sub-band of the two or more sub-bands within the carrier on which to perform the listen-before-talk procedure of the first type.

23. The apparatus of claim 1, wherein the instructions executable by the processor to cause the apparatus to select the at least one sub-band of the two or more sub-bands within the carrier comprise instructions executable by the processor to cause the apparatus to:
receive an indication from the base station that the UE is to perform the listen-before-talk procedure of the first type on the at least one sub-band of the two or more sub-bands within the carrier; and
select the at least one sub-band of the two or more sub-bands within the carrier on which to perform the listen-before-talk procedure of the first type based at least in part on the received indication.

24. The apparatus of claim 1, wherein the listen-before-talk procedure of the first type comprises a fairness-based listen-before-talk procedure for performing channel sensing and backoff and the one or more listen-before-talk procedures of the second type comprise one-time listen-before-talk procedures.

25. An apparatus for wireless communication at a user equipment (UE), comprising:
a processor,
memory in electronic communication with the processor; and
instructions stored in the memory and executable by the processor to cause the apparatus to:
identify a plurality of carriers and a plurality of sub-bands within the plurality of carriers configured for uplink transmissions from the UE to a base station in a shared radio frequency spectrum;
perform respective listen-before-talk procedures of a first type on two or more sub-bands within a selected carrier of the plurality of carriers;
perform one or more listen-before-talk procedures of a second type on sub-bands of the plurality of sub-bands within carriers of the plurality of carriers different from the selected carrier;
determine that at least one listen-before-talk procedure of the first type on the one sub-band or of the second type on the remaining sub-bands has failed; and
communicate on the carriers of the plurality of carriers different from the selected carrier based at least in part on the listen-before-talk procedure of the first type and the one or more listen-before-talk procedures of the second type, wherein communicating on the carriers of the plurality of carriers different from the selected carrier comprises suppressing communication on the selected carrier based at least in part on determining that the at least one listen-before-talk procedure on sub-bands of the selected carrier has failed.

26. The apparatus of claim 25, wherein the instructions are further executable by the processor to cause the apparatus to:
determine that each of the respective listen-before-talk procedures of the first type performed on the two or more sub-bands within the selected carrier is successful;
determine that a listen-before-talk procedure of the second type performed on a sub-band of the plurality of sub-bands within a carrier of the plurality of carriers that is different from the selected carrier is successful; and
transmit at least a portion of the uplink transmissions on the sub-band within the carrier.

27. The apparatus of claim 25, wherein the instructions are further executable by the processor to cause the apparatus to:
determine that at least one of the respective listen-before-talk procedures of the first type performed on the two or more sub-bands within the selected carrier has failed;
determine that a listen-before-talk procedure of the second type performed on a sub-band of the plurality of sub-bands within a carrier of the plurality of carriers that is different from the selected carrier is successful; and
suppress the uplink transmissions on the sub-band within the carrier.

28. A method for wireless communication at a user equipment (UE), comprising:
identifying a plurality of carriers and a plurality of sub-bands within the plurality of carriers configured for uplink transmissions from the UE to a base station in a shared radio frequency spectrum;
selecting a carrier from the plurality of carriers and one sub-band of two or more sub-bands within the carrier on which to perform a listen-before-talk procedure of a first type, the two or more sub-bands being a part of the plurality of sub-bands configured for the uplink transmissions;
performing the listen-before-talk procedure of the first type on the one sub-band of the two or more sub-bands within the selected carrier;
performing one or more listen-before-talk procedures of a second type on sub-bands of the plurality of sub-bands within carriers of the plurality of carriers different from the selected carrier;
performing one or more listen-before-talk procedures of the second type on remaining sub-bands of the two or more sub-bands within the selected carrier;
determining that at least one listen-before-talk procedure of the first type on the one sub-band or of the second type on the remaining sub-bands has failed; and
communicating on the carriers of the plurality of carriers different from the selected carrier based at least in part on the listen-before-talk procedure of the first type and the one or more listen-before-talk procedures of the second type, wherein communicating on the carriers of the plurality of carriers different from the selected carrier comprises suppressing communication on the selected carrier based at least in part on determining that the at least one listen-before-talk procedure on sub-bands of the selected carrier has failed.

29. The method of claim 28, wherein the listen-before-talk procedure of the first type comprises a first listen-before-talk procedure of the first type, wherein the instructions are further executable by the processor to cause the apparatus to:
    initiating a second listen-before-talk procedure of the first type based at least in part on the determining.

30. A method for wireless communication at a user equipment (UE), comprising:
    identifying a plurality of carriers and a plurality of sub-bands within the plurality of carriers configured for uplink transmissions from the UE to a base station in a shared radio frequency spectrum;
    performing respective listen-before-talk procedures of a first type on two or more sub-bands within a selected carrier of the plurality of carriers;
    performing one or more listen-before-talk procedures of a second type on sub-bands of the plurality of sub-bands within carriers of the plurality of carriers different from the selected carrier;
    determining that at least one listen-before-talk procedure of the first type on the one sub-band or of the second type on the remaining sub-bands has failed; and
    communicating on the carriers of the plurality of carriers different from the selected carrier based at least in part on the listen-before-talk procedures of the first type and the one or more listen-before-talk procedures of the second type, wherein communicating on the carriers of the plurality of carriers different from the selected carrier comprises suppressing communication on the selected carrier based at least in part on determining that the at least one listen-before-talk procedure on sub-bands of the selected carrier has failed.

* * * * *